United States Patent
Wilke et al.

(10) Patent No.: US 11,347,894 B2
(45) Date of Patent: May 31, 2022

(54) HASH VALUES FOR A BIDIRECTIONALLY LINKED BLOCKCHAIN

(71) Applicant: Bundesdruckerei GMBH, Berlin (DE)

(72) Inventors: Andreas Wilke, Berlin (DE); David Fabian, Berlin (DE); Ilya Komarov, Berlin (DE); Manfred Paeschke, Wandlitz (DE)

(73) Assignee: Bundesdruckerei GMBH, Berlin (DE)

( * ) Notice: Subject to any disclaimer, the term of this patent is extended or adjusted under 35 U.S.C. 154(b) by 185 days.

(21) Appl. No.: 16/498,134

(22) PCT Filed: Feb. 23, 2018

(86) PCT No.: PCT/EP2018/054557
§ 371 (c)(1),
(2) Date: Sep. 26, 2019

(87) PCT Pub. No.: WO2018/177662
PCT Pub. Date: Oct. 4, 2018

(65) Prior Publication Data
US 2020/0057869 A1 Feb. 20, 2020

(30) Foreign Application Priority Data
Mar. 27, 2017 (DE) ............... 10 2017 205 163.9

(51) Int. Cl.
*H04L 29/06* (2006.01)
*G06F 21/64* (2013.01)
*H04L 9/32* (2006.01)

(52) U.S. Cl.
CPC ............ *G06F 21/64* (2013.01); *H04L 9/3236* (2013.01); *H04L 2209/38* (2013.01)

(58) Field of Classification Search
CPC .... G06F 21/64; H04L 9/3236; H04L 2209/38
See application file for complete search history.

(56) References Cited

U.S. PATENT DOCUMENTS

2016/0261690 A1* 9/2016 Ford .................... H04L 41/0806
2017/0070890 A1* 3/2017 Luff ........................ H04W 4/70
(Continued)

FOREIGN PATENT DOCUMENTS

WO WO-2016161073 A1 10/2016

OTHER PUBLICATIONS

International Search Report PCT/ISA/210 for International Application No. PCT/EP2018/054557 filed Feb. 23, 2018.
(Continued)

*Primary Examiner* — Taghi T Arani
*Assistant Examiner* — Lin Chang
(74) *Attorney, Agent, or Firm* — Harness, Dickey & Pierce, P.L.C.

(57) ABSTRACT

The method includes generating an additional block for expanding a blockchain structure, which includes the data to be stored and is intended to be linked bidirectionally to the last block of the blockchain structure; calculating a first check value of the last block for bidirectionally linking the additional block to the last block of the blockchain structure; calculating a check value of the additional block for bidirectionally linking the additional block to the last block of the blockchain structure; adding the first check value of the last block to the last block and; adding the check value of the additional block to the additional block.

26 Claims, 13 Drawing Sheets

(56) References Cited

U.S. PATENT DOCUMENTS

| 2017/0116136 | A1* | 4/2017 | Macnicol | G06F 16/2255 |
| 2018/0219669 | A1* | 8/2018 | Chen | H04L 9/002 |
| 2019/0073646 | A1* | 3/2019 | Wright | G06Q 20/223 |
| 2019/0103975 | A1* | 4/2019 | Jacobs | H04L 9/3239 |

OTHER PUBLICATIONS

Written Opinion of the International Searching Authority PCT/ISA/237 for International Application No. PCT/EP2018/054557 filed Feb. 23, 2018.

International Preliminary Report on Patentability for corresponding PCT Application No. PCT/EP2018/054557 dated Oct. 10, 2019.

Juan Garay et al., "The Bitcoin Backbone Protocol: Analysis and Applications," International Association For Cryptologic Research, vol. 20160127:132350, Jan. 27, 2016, pp. 1-37, XP061019626.

* cited by examiner

HASH VALUES FOR A BIDIRECTIONALLY LINKED BLOCKCHAIN

CROSS-REFERENCE TO RELATED APPLICATIONS

This application is a national phase under 35 U.S.C. § 371 of PCT International Application No. PCT/EP2018/054557 which has an International filing date of Feb. 23, 2018 which claims priority to German patent application number DE 10 2017 205 163.9 filed Mar. 27, 2017.

The invention relates to a method and to an electronic data storage system for storing data. In particular, the invention relates to a method and to an electronic data storage system for storing data in a tamper-proof manner in a blockchain structure linked with bidirectional functions.

The possibility of modifying or even deliberately tampering with digitally encoded data in electronic storage devices presents a technical challenge.

Blockchain structures are known from the prior art for securing data. These blockchain structures are unidirectionally linked blockchain structures. For example, appropriate blockchain structures are used to log transactions of cryptocurrencies, such as the Bitcoin payment system.

A blockchain structure provides an expandable list of data sets, which are arranged in blocks. In the prior art, the integrity of the individual blocks is protected by unidirectional link, using cryptographic check values of the individual blocks in the form of hash values. A linking of the block is achieved in that each block includes a cryptographic check value of the preceding block, including the cryptographic check value stored in the preceding block. Each block includes a check value, which is based on the content of all preceding blocks. It is therefore difficult to subsequently manipulate such a blockchain. This would require manipulating not just a single block, but all subsequent blocks, since the check value of each subsequent block is based, among other things, on the block to be manipulated. If the block to be manipulated is in fact manipulated, the check value thereof changes. This changed check value no longer matches the check values of the subsequent blocks, making the manipulation recognizable and obvious during a check by way of the check values.

Known blockchain structures, however, only implement unidirectional linking and data security, since only data contents of preceding blocks are taken into consideration in each case during linking. It is thus possible to check based on the link whether a preceding block of a presented blockchain structure was tampered with. However, it is not possible to check whether the presented blockchain structure is complete. In particular, it is not possible to check whether potentially a portion of the blockchain structure was cut off. Moreover, it is not possible to check whether the last block was tampered with.

Furthermore, common hash methods are used when checking and securing the blockchain structure. Individual blocks of the blockchain structure are unidirectionally linked to one another by hash values. To be able to check such a blockchain structure, having blocks that are unidirectionally linked to one another, for manipulation, not only all the information of the individual blocks, but also the respective hash value thereof is required. Checking such a blockchain structure moreover makes it necessary to start with the first block of the corresponding blockchain structure, and to end with the last block.

It is the object of the invention to create an improved method for storing data in a tamper-proof manner.

The object underlying the invention is achieved by the features of the independent claims. Embodiments of the invention are described in the dependent claims.

Embodiments comprise a method for storing data in a tamper-proof manner in an electronic storage device, using a blockchain structure linked with bidirectional functions, which comprises at least a first block and a last block. The method comprises:

providing a bidirectionally linked blockchain structure;
providing the data to be stored;
generating an additional block for expanding the blockchain structure, which includes the data to be stored and is intended to be linked bidirectionally to the last block of the blockchain structure, the last block of the blockchain structure including stored data;
calculating a first check value of the last block for bidirectionally linking the additional block to the last block of the blockchain structure, the first check value of the last block being calculated using a first hash value, the calculation of which comprises applying a hash function to the data stored in the last block and to the data to be stored in the additional block;
calculating a check value of the additional block for bidirectionally linking the additional block to the last block of the blockchain structure, the check value of the additional block being calculated using a second hash value, the calculation of which comprises applying the hash function to the data stored in the last block and to the data to be stored in the additional block;
adding the first check value of the last block to the last block;
adding the check value of the additional block to the additional block; and
storing the blockchain structure expanded by the additional block.

Embodiments may have the advantage that they allow a blockchain to be provided which is bidirectionally linked using hash methods. The linking furthermore enables bidirectional checking of the blockchain structure for authenticity or manipulation. The blockchain structure may not only be checked in one direction, but in two directions in the process. Moreover, increased security may be achieved through more complex and secure hash methods.

A blockchain structure shall be understood to mean a data structure forming a blockchain. A "blockchain" shall be understood to mean an ordered data structure comprising a plurality of mutually linked data blocks. In particular, a blockchain shall be understood to mean a database, the integrity of which, that is, security against subsequent manipulation, is ensured by storing a check value, such as a hash value, of the preceding data set in the respective following data set. The check value is assigned to the content of the preceding data set and unambiguously characterizes the same. If the content of the preceding data set is altered, it no longer meets the assigned check value, whereby the alteration becomes evident. In the case of known blockchain structures, for example, each block of the blockchain is unambiguously identified by a hash value and references a previous block in the blockchain, the hash value of which the block includes.

For examples of a blockchain, see https://en.wikipedia.org/wiki/Block_chain_(database) and "Mastering Bitcoin," Chapter 7, The Blockchain, page 161 ff. The blockchain concept was described in 2008, for example, in a whitepaper under the pseudonym Satoshi Nakamoto in the context of the Bitcoin cryptocurrency ("Bitcoin: Peer-to-Peer Electronic Cash System" (https://bitcoin.org/bitcoin.pdf)). In this exemplary embodiment, each block of the blockchain, in the header thereof, includes the hash of the entire prior block header. In this way, the sequence of blocks is clearly established, creating a chain structure. As a result of the concatenation of the individual blocks thus implemented, it is achieved that a subsequent alteration of prior blocks is not possible, without likewise altering all subsequent blocks.

The security of the blockchain structure may be increased, for example, by publishing it or making it publicly accessible, thereby allowing a comparison between an available copy of the blockchain structure to other published or accessible copies of the same blockchain structure.

A check value for data is a value that is assigned to the corresponding data and unambiguously characterizes the data in such a way that the integrity of the data may be checked based on the check value. A check value in the form of a checksum, for example, provides a value that was calculated from the original data and is configured to recognize at least one bit error in the data. As a function of the complexity of the calculation rule for the checksum, it is possible to recognize, or also correct, more than one error. Known check values or checksums may be based, for example, on adding up data values, calculating a digit sum, a parity bit, a weighted average of the data, or on more complex calculation methods, such as a cyclic redundancy check or the use of a hash function. According to embodiments, the check values each include a hash value calculated from the corresponding data using a hash function.

In the case of a unidirectionally linked blockchain structure, a check value is calculated using a block of the blockchain structure, and is added to an additional block to be linked unidirectionally to this block. Based on the check value of the added block, it is possible to check the integrity of the block or of the data of the corresponding block to which the added block is unidirectionally linked. For this purpose, the check value is recalculated, for example, using the data of the corresponding block and is compared to the check value provided by the added block. If the two check values agree, the integrity of the block, or of the data of the corresponding block, to which the added block is unidirectionally linked has been preserved.

In the case of the bidirectionally linked blockchain structure according to embodiments, a check value is not only calculated using data of the last block of the blockchain structure, but also using data of the additional block to be bidirectionally linked to this block. Based on such a check value of the added block, it is possible to check the integrity of the block, or of the data of the corresponding block, to which the added block is bidirectionally linked, as a function of the data of the added block. For this purpose, the check value is recalculated, for example, using the data of the corresponding block and the data of the added block, and is compared to the check value provided by the added block. If the two check values agree, the integrity of the block, or of the data of the corresponding block, to which the added block is bidirectionally linked, as well as the integrity of the additional block, or of the data of the additional block, is preserved.

If a check value of the bidirectional link is added both to the added additional block and to the block to which the added additional block is bidirectionally linked, an integrity check may furthermore be carried out based on the check value added to the corresponding block.

Based on a check value of the last block to which the added block is bidirectionally linked, it is also possible to recognize, contrary to known unidirectionally linked blockchain structures, whether the blockchain structure was cut off. Since, in the case of known unidirectionally linked blockchain structures, the respective check values include only information about preceding blocks, it is not possible to recognize based on such a check value whether subsequent blocks exist. As a result, it is also not possible to recognize when subsequent blocks are altered, replaced or removed as part of a manipulation. In contrast, according to embodiments, the respective check values of the bidirectional link include information about the two blocks that are linked. Moreover, such a respective check value is added to each of the two corresponding blocks. If the added block is altered, replaced or removed as part of a manipulation, this may be recognized based on the check value of the last block to which the added block is bidirectionally linked.

According to embodiments, the last block of the blockchain structure includes a second check value of the last block, which bidirectionally links the last block to a penultimate block of the blockchain structure, wherein the second check value of the last block was calculated using a third hash value, the calculation of which comprises applying the hash function to data stored in the penultimate block and to the data stored in the last block.

Embodiments may have the advantage that the last block of the blockchain structure, which becomes the penultimate block of the resulting expanded blockchain structure as a result of the expansion of the blockchain structure by the additional block, includes both a first check value, which bidirectionally links the last block to the additional block, and a second check value, which bidirectionally links the last block to the penultimate block. Based on the last block of the blockchain structure or the penultimate block of the resulting expanded blockchain structure, it is thus possible to check not only the integrity of the subsequent block, but also of the preceding block.

According to embodiments, apart from the first and last blocks. the blocks of the resulting blockchain structure thus each include at least two check values: a check value that establishes a bidirectional link to the immediately preceding block, and a check value that establishes a bidirectional link to the immediately following block. According to embodiments, the two check values may be combined with one another by applying a hash function to an association of the two check values. For example, the association may be an arithmetic operation, such as addition, subtraction, multiplication and/or division.

According to embodiments, the method furthermore comprises:
 calculating a combined check value of the last block, the combined check value of the last block being calculated using a fourth hash value, the calculation of which comprises applying the hash function to a combination of the first check value and the second check value of the last block; and
 adding the combined check value of the last block to the last block of the blockchain structure.

Embodiments may have the advantage that the combined check value is based on the data of the penultimate block of the blockchain structure, of the last block of the blockchain structure, and of the additional block. Based on the combined check value, it is thus possible to check the preceding block and the subsequent block simultaneously for the integrity thereof.

According to embodiments, the combined check value $KPW_N$ of the last block is calculated as follows:

$$KPW_N = \text{Hash}\{PW_{N-1} + PW_N\},$$

where $PW_{N-1}$ denotes the second check value of the last block, and $PW_N$ denotes the first check value of the last block. According to an alternative notation, the combined check value $KPW_N$ of the last block calculated as follows:

$$KPW_N = \text{Hash}\{PW2_{N-1} + PW1_N\},$$

where $PW2_{N-1}$ denotes the second check value of the last block, and $PW1_N$ denotes the first check value of the last block.

Embodiments may have the advantage that an efficient and secure method for calculating the combined check value $KPW_N$ of the last block, that is of the Nth block of the blockchain structure, is provided.

According to embodiments, the last block includes a placeholder, which identifies the last block as the last block of the blockchain structure, wherein the addition of the first check value of the last block to the last block comprises: replacing the placeholder of the last block with the first check value of the last block.

Embodiments may have the advantage that the last block of the blockchain structure may always be recognized based on the placeholder. If the end of the blockchain structure is cut off in the course of a manipulation, the resulting cut-off blockchain structure no longer includes a block that is identified as the last block by a corresponding placeholder. In this way, it is possible to readily recognize that the corresponding blockchain structure is not complete solely based on the absence of the corresponding placeholder. According to embodiments, the placeholder includes, for example, one or more zeros or consists exclusively of one or more zeros.

According to embodiments, the additional block includes a placeholder that identifies the additional block as the last block of the expanded blockchain structure. Embodiments may have the advantage that the additional block is recognized as the last block of the expanded blockchain structure after the expansion of the blockchain structure. It the same time, it is possible to recognize that the expanded blockchain structure is complete, and that no actually following blocks were removed.

According to embodiments, the method furthermore comprises:
calculating a combined check value of the additional block, the combined check value of the additional block being calculated using a fifth hash value, the calculation of which comprises applying the hash function to a combination of the check value of the additional block and the placeholder of the additional block; and
adding the combined check value of the additional block to the additional block of the blockchain structure.

Embodiments may have the advantage that it is possible to check based on the combined check value whether the additional block is in fact the last block of the expanded blockchain structure. At the same time, the integrity of the preceding block may be checked based on the combined check value.

According to embodiments, the combined check value $KPW_{N+1}$ of the additional block is calculated as follows:

$$KPW_{N+1} = \text{Hash}\{PW_N + PH_{N+1}\},$$

where $PW_N$ denotes the check value of the additional block, and $PH_{N+1}$ denotes the placeholder of the additional block. According to an alternative notation, the combined check value $KPW_{N+1}$ of the additional block is calculated as follows:

$$KPW_{N+1} = \text{Hash}\{PW2_N + PH_{N+1}\},$$

where $PW2_N$ denotes the check value of the additional block, and $PH_{N+1}$ denotes the placeholder of the additional block.

Embodiments may have the advantage that an efficient and secure method for calculating the combined check value $KPW_{N+1}$ of the additional block, that is of the (N+1)th block of the expanded blockchain structure, is provided.

According to embodiments, the first block of the blockchain structure includes a placeholder that identifies the first block as the first block of the blockchain structure. Embodiments may have the advantage that the first block of the blockchain structure may always be recognized based on the placeholder. If the beginning of the blockchain structure is cut off in the course of a manipulation, the resulting cut-off blockchain structure no longer includes a block that is identified as the first block by a corresponding placeholder. In this way, it is possible to readily recognize that the corresponding blockchain structure is not complete solely based on the absence of the corresponding placeholder. According to embodiments, the placeholder includes, for example, one or more zeros or consists exclusively of one or more zeros.

According to embodiments, the first block of the blockchain structure includes a combined check value $KPW_1$ of the first block, which was calculated as follows:

$$KPW_1 = \text{Hash}\{PH_1 + PW_1\},$$

where $PH_1$ denotes the placeholder of the first block, and $PW_1$ denotes a check value of the first block. The check value of the first block establishes a bidirectional link to the second block of the blockchain structure. The check value of the first block was calculated using a hash value, the calculation of which comprises applying the hash function to the data stored in the first block and to the data stored in the second block. According to an alternative notation, the combined check value $KPW_1$ of the first block was calculated as follows:

$$KPW_1 = \text{Hash}\{PH_1 + PW1_1\},$$

where $PH_1$ denotes the placeholder of the first block, and $PW1_1$ denotes a check value of the first block.

Embodiments may have the advantage that an efficient and secure method for calculating the combined check value $KPW_1$ of the first block of the blockchain structure is provided.

According to embodiments, the blocks of the blockchain structure each have a square (M×M) matrix structure, wherein M is a natural number greater than or equal to two. According to embodiments, the stored data of the blocks of the blockchain structure is in each case encompassed by entries of a square submatrix of the matrix structure of the corresponding block.

Embodiments may have the advantage that they provide a structuring of the blocks, which allows effective recognition of the data and check values and/or calculation of the check values. According to embodiments, the first check value of a corresponding block is encompassed by one or more entries or elements of a column or row of the square (M×M) matrix structure. According to embodiments, the first check value is encompassed by the Mth column or row or by the first column or row of the square (M×M) matrix structure. According to embodiments, the second check value of the corresponding block is encompassed by one or more entries or elements of a row or column of the square (M×M) matrix structure. According to embodiments, the first check value is encompassed by the Mth row or column or by the first row or column of the square (M×M) matrix structure. According to embodiments, the combined check value of the corresponding block is encompassed by the element $a_{MM}$ or $a_{11}$ of the square (M×M) matrix structure. According to embodiments, the square submatrix is a [(M−1)×(M−1)] matrix.

According to embodiments, the calculation of the first check value of the last block and the calculation of the check value of the additional block comprise:
- calculating a combination of the data stored in the last block and of the data stored in the additional block;
- calculating a hash value of the combination of the data stored in the last block and of the data stored in the additional block; and
- dividing the hash value of the combination of the data stored in the last block and of the data stored in the additional block into a first portion and a second portion, the first check value of the last block including the first portion, and the check value of the additional block including the second portion.

Embodiments may have the advantage that they provide an effective method for calculating the two check values of the last block and of the additional block. According to embodiments, the two resulting check values of the last block and of the additional block are thus different.

According to embodiments, the combination of the data stored in the last block and of the data stored in the additional block includes a product of the submatrix of the last block, the entries of which encompass the data stored in the last block, and of the submatrix of the penultimate block, the entries of which encompass the data to be stored in the additional block. According to embodiments, the first check value $PW1_N$ of the last block and the check value $PW2_N$ of the additional block are calculated as follows:

$$\text{Hash}\{D_N * D_{N+1}\} = PW1_N + PW2_N,$$

where $D_N$ denotes the submatrix of the last block, the entries of which encompass the stored data of the last block, and $D_{N+1}$ denotes the submatrix of the additional block, the entries of which encompass the stored data of the additional block.

Embodiments may have the advantage that the unambiguous matrix resulting from the matrix multiplication $D_N * D_{N+1}$ is used as input for a hash function. As a result of the mathematical unambiguousness of the matrix multiplication, it is possible to ensure that a manipulation of the data in the last block N or in the additional block N+1 manifests itself in an alteration of the calculated hash value, and thus in the first check value of the last block and the check value of the additional block.

According to embodiments, the calculation of the second check value of the last block comprises:
- calculating a combination of the data stored in the penultimate block of the blockchain structure and of the data stored in the last block;
- calculating a hash value of the combination of the data stored in the penultimate block and of the data stored in the last block; and
- dividing the hash value of the combination of the data stored in the penultimate block and of the data stored in the last block into a first portion and a second portion, a check value of the penultimate block including the first portion, and the second check value of the last block including the second portion.

Embodiments may have the advantage that the check value of the penultimate block and the second check value of the last block are calculated analogously to the first check value of the last block and the check value of the additional block. According to embodiments, the combination of the data stored in the penultimate block and of the data stored in the last block includes a product of the submatrix of the penultimate block, the entries of which encompass the data stored in the penultimate block, and of the submatrix of the last block, the entries of which encompass the data to be stored in the last block. According to embodiments, the check value $PW1_{N-1}$ of the penultimate block and the second check value $PW2_{N-1}$ of the last block are calculated as follows:

$$\text{Hash}\{D_{N-1} * D_N\} = PW1_{N-1} + PW2_{N-1},$$

where $D_{N-1}$ denotes the submatrix of the penultimate block, the entries of which encompass the stored data of the penultimate block, and $D_N$ denotes the submatrix of the last block, the entries of which encompass the stored data of the last block.

According to embodiments, the first check value of the last block and the check value of the additional block are identical. Embodiments may have the advantage that the calculation of the corresponding check values may be carried out efficiently, and each of the two check values on its own allows the bidirectional linkage between the last block and the additional block to be checked.

According to embodiments, the first check value $PW_N$ of the last block is calculated as follows:

$$PW_N = \text{HASH}\{D_{N+1} + \text{HASH}[D_N + PW_{N-1}]\},$$

where $D_{N+1}$ denotes the data to be stored of the additional block, $D_N$ denotes the stored data of the last block, and $PW_{N-1}$ denotes the second check value of the last block.

According to embodiments, the second check value $PW_{N-1}$ of the last block was calculated as follows:

$$PW_{N-1} = \text{Hash}\{D_N + \text{Hash}[D_{N-1} + PW_{N-2}]\},$$

where $D_N$ denotes the stored data of the last block, $D_{N-1}$ denotes the stored data of the penultimate block, and $PW_{N-2}$ denotes a check value of the penultimate block.

Embodiments may have the advantage that, proceeding from the first block of the blockchain having the check value $PW_1$, it is possible to calculate all check values of the following blocks. For example, $PW_1$ is calculated as follows:

$$PW_1 = \text{Hash}\{D_2 + \text{Hash}[D_1 + PH_1]\},$$

where $D_2$ denotes the stored data of the second block, $D_1$ denotes the stored data of the first block, and $PH_1$ denotes the placeholder of the first block, which identifies the first block as the first block of the blockchain structure. The calculation may be started for any arbitrary block of the blockchain structure proceeding from a check value of the corresponding block. It shall be emphasized that each of these check values according to the above formulas is dependent on the data of the two blocks to be linked bidirectionally to one another by this check value, and on the data of all preceding blocks.

According to embodiments, consecutive blocks of the bidirectionally linked blockchain structure are each bidirectionally linked to one another, wherein in each case the preceding block of two consecutive blocks includes a check value of the preceding block, which was calculated using data of the preceding block and data of the subsequent block, and the subsequent block of the consecutive blocks includes a check value of the subsequent block, which was calculated using data of the preceding block and data of the subsequent block.

According to embodiments, the data to be stored includes data that is characteristic of the content of a digitally encoded document, wherein the provision of the data to be stored includes receiving the data by way of a communication interface via a network from a computer system creating the digitally encoded document, the method furthermore comprising:

receiving a request for a current version of the blockchain structure by way of the communication interface via the network from a requesting computer system; and transmitting the expanded blockchain structure by way of the communication interface via the network to the requesting computer system in response to the received request.

Embodiments may have the advantage that the integrity of a digitally encoded document may be checked based on the data recorded in the blockchain structure. For a present digitally encoded document, data that is characteristic of the content of this document may be calculated. For example, a hash value of the content of the digitally encoded document may be calculated. This data may be compared to the blockchain structure: If the blockchain structure includes the corresponding data, the integrity of the digitally encoded document is confirmed, and the document is acknowledged as authentic. If the blockchain structure does not include the corresponding data, the integrity of the digitally encoded document is denied. The blockchain structure may offer the advantage that the size thereof may be kept compact when the blockchain structure only includes hash values of the digitally encoded documents. Furthermore, it is not possible to infer the contents of the corresponding documents based on the hash values of the digitally encoded documents, thereby further increasing security. Finally, a current version of the blockchain structure may, for example, be downloaded via the network to a portable mobile telecommunications device, and subsequently be used to check digitally encoded documents, even if the network link is interrupted, that is, the portable mobile telecommunications device is in an offline mode.

A "document" shall, in particular, be understood to mean news message, a text, a record, a credential or an identification, value or security document, in particular a document from a governing body, in particular a paper-based and/or plastic-based document, such as an electronic identification document, in particular a passport, an identification card, a visa, a driver's license, a vehicle registration, a vehicle title, a health insurance card or a company ID card, or another ID document, a chip card, a payment instrument, in particular a bank note, a bank card or a credit card, a bill of lading or other proof of authority. In particular, the document may be a machine-readable travel document, such as are standardized by the International Civil Aviation Organization (ICAO) and/or the German Federal Office for Information Security (BSI). A record is a declaration in text or written form which documents a particular statement of facts or presentation of facts. Moreover, the record may identify the issuer of the instrument.

A digitally encoded document shall be understood to mean a data construct for electronic data processing which comprises digitally encoded data. This may, in particular, be an electronic file having an arbitrary data format, such as a text, table, sound, image and/or video file. According to embodiments, the electronic file may be executable or non-executable. A digitally encoded document may, for example, be a document that was created in or translated into a file form by digitizing a document having a physical document body, that is, a conversion of the data encompassed by the physical document body into a binary code. In particular, the validity of such a document is independent from the existence of a permanently associated document body.

According to embodiments, a digitally encoded document may be created, for example, by generating a file including the data of the corresponding document on a computer. Furthermore, a virtual document may, for example, also be created by scanning or photocopying a physical document body, such as a document on paper.

According to embodiments, the data to be stored includes data of a transaction, the provision of the data to be stored comprising receiving the data by way of a communication interface via a network from a computer system involved in the completion of the transaction, the method furthermore comprising:

receiving a request for a current version of the blockchain structure by way of the communication interface via the network from a requesting computer system; and transmitting the expanded blockchain structure by way of the communication interface via the network to the requesting computer system in response to the received request.

Embodiments may have the advantage that transactions may be logged based on the data recorded in the blockchain structure. The transaction may, for example, be transactions of a cryptocurrency, a traditional currency, a sale, a shipment, a conveyance of property or a transfer of an item and/or of a digitally encoded document.

According to embodiments, the data to be stored includes status data of a device, the provision of the data to be stored including receiving the data by way of a communication interface via a network from a computer system detecting the status data by way of a sensor, the method furthermore comprising:

receiving a request for a current version of the blockchain structure by way of the communication interface via the network from a requesting computer system; and transmitting the expanded blockchain structure by way of the communication interface via the network to the requesting computer system in response to the received request.

Embodiments may have the advantage that the status and/or the status history of a device may be logged based on the status data recorded in the blockchain structure. For example, such a device may be a production device, a component of a computer system, a locking system, an access control device or a vehicle. A "vehicle" shall be understood to mean a mobile means of transportation here. Such a means of transportation may be used, for example, to transport goods (freight traffic), tools (machinery or auxiliary devices) or persons (passenger traffic). Vehicles also include, in particular, motor- or engine-driven means of transportation. For example, a vehicle may be a land vehicle, a watercraft and/or an aircraft. A land vehicle may be, for example: an automobile, such as a passenger car, a bus or a truck, a motor-powered two-wheeler, such as a motorcycle, a moped, a motor scooter or a motor-driven bicycle, an agricultural tractor, a forklift truck, a golf cart or a truck-mounted crane. A land vehicle may moreover also be a rail-bound vehicle. A watercraft may be, for example: a ship or a boat. Furthermore, an aircraft may be, for example: an airplane or a helicopter. A vehicle shall, in particular, also be understood to mean a motor vehicle.

A "sensor" shall be understood to mean an element for detecting measuring data here. Measuring data is data that qualitatively or quantitatively expresses physical or chemical properties of a measuring object, such as amount of heat, temperature, moisture, pressure, sound field variables, electromagnetic field strength, brightness, acceleration, change in position, pH value, ionic strength, electrochemical potential, and/or the material makeup thereof. Measuring data is detected by way of physical or chemical effects and converted into an electronically processable electrical signal. Moreover, measuring data may express statuses and/or changes in status of electronic devices or as a result of a use by a user.

According to embodiments, the status data may also include data about functions carried out by the device. For example, in this way it is possible to log manufacturing and/or processing operations carried out by a production device. Furthermore, it is possible to log actions of an access control device, wherein the logged data may include information as to who gained access to a secured area via the access control device, and when.

According to embodiments, the data to be stored includes data characterizing a processing operation of a digitally encoded document, the provision of the blockchain structure including receiving the document to be processed, which includes the blockchain structure, and reading out the blockchain structure from the received document, the provision of the data to be stored including processing the received document and generating the data, and the storage of the expanded blockchain structure including adding the expanded blockchain structure to the processed document and storing the processed document including the expanded blockchain structure.

Embodiments may have the advantage that processing operations of a digitally encoded document may be logged based on the data recorded in the blockchain structure. For example, it may be logged who accessed the document, and when, and whether or what changes were made to the document. Furthermore, it is possible, for example, to log copying processes of the document and to add the expanded blockchain structure to the created copy. In this case, the blockchain structure includes a history of origin of the created copy.

According to embodiments, the method furthermore comprises:
 receiving a request for the processed document by way of a communication interface via a network from a requesting computer system; and
 transmitting the processed document including the expanded blockchain structure by way of the communication interface via the network to the requesting computer system in response to the received request.

Embodiments may have the advantage that the processing history and/or history of origin of the processed document may be tracked and/or verified based on the blockchain structure.

The document may, in particular, be a news message, such as in the form of a website, or a file or a posting linked to a website or integrated into a website. A website or web document, Internet page or web page shall be understood to mean a document provided over the Internet, which is made available by a web server, for example, and may be accessed using a browser of a user computer system by entering a uniform resource locator (URL). This is an HTML document, for example. A posting here shall be understood to mean an individual article on an Internet platform, such as a social media platform, on a web forum or a blog.

Embodiments comprise an electronic data storage system for storing data in a tamper-proof manner in a bidirectionally linked blockchain structure, which comprises at least a first block and a last block, the data storage system comprising a processor and an electronic storage device including machine-readable instructions, an execution of the machine-readable instructions by the processor prompting the data storage system to carry out a method, comprising:
 providing a bidirectionally linked blockchain structure;
 providing the data to be stored;
 generating an additional block for expanding the blockchain structure, which includes the data to be stored and is intended to be linked bidirectionally to the last block of the blockchain structure, the last block of the blockchain structure including stored data;
 calculating a first check value of the last block for bidirectionally linking the additional block to the last block of the blockchain structure, the first check value of the last block being calculated using a first hash value, the calculation of which comprises applying a hash function to the data stored in the last block and to the data to be stored in the additional block;
 calculating a check value of the additional block for bidirectionally linking the additional block to the last block of the blockchain structure, the check value of the additional block being calculated using a second hash value, the calculation of which comprises applying the hash function to the data stored in the last block and to the data to be stored in the additional block;
 adding the first check value of the last block to the last block;
 adding the check value of the additional block to the additional block; and
 storing the blockchain structure expanded by the additional block.

According to embodiments, the electronic data storage system is configured to carry out one or more of the aforementioned embodiments of the method for storing data in a tamper-proof manner.

According to embodiments, the electronic data storage system comprises a file system. The file system provides organized filing on the data storage unit. Data, such as digitally encoded documents, may be stored on the data storage unit as files. Furthermore, the files may be read, modified or deleted.

According to embodiments, the electronic data storage system comprises a database. A database or a database system refers to a system for electronic data management. A database system allows large volumes of data to be stored efficiently, consistently and permanently, and required subsets to be provided in various demand-based forms of representation for users and application programs. The database system comprises, for example, a database management system and a database in the narrower sense, or a data platform. The database management system provides management software for managing data of the database. The management software internally organizes the structure storage of the data and controls all read and write access to the database. The data platform encompasses the volume of data to be managed. Data, such as digitally encoded documents, for example, are stored as part of the data platform in this case.

The storage device may comprise a removable storage device, for example, that is, a data carrier for a computer system which is not fixedly installed, replaceable and/or portable. For example, removable storage devices include Blu-ray discs, CDs, diskettes, DVDs, HD DVDs, magnetic tapes, MO/MODs, solid state drives (SSDs), memory cards, USB sticks or removal hard disks.

Embodiments comprise a telecommunications system, which comprises the aforementioned electronic data storage system and a communication interface for communicating via a network, the provision of the data to be stored including receiving the data by way of a communication interface via a network, the carried-out method furthermore comprising:

receiving a request for a current version of the blockchain structure by way of the communication interface via the network from a requesting telecommunications system; and transmitting the expanded blockchain structure by way of the communication interface via the network to the requesting telecommunications system in response to the received request.

For example, the telecommunications system is a computer system configured to communicate via a network.

A network may, for example, encompass a local network, in particular a local area network (LAN), a private network, in particular an Intranet, or a virtual private network (VPN). For example, the computer system may comprise a standard radio interface for connection to a WLAN. Furthermore, it may be a public network, such as the Internet. Furthermore, it may be a digital cellular mobile communication network, for example.

A "computer system" here shall be understood to mean a device processing data by way of programmable processing rules using electronic circuits. A "program" or "program instructions" here shall be understood to mean any type of computer program, without restriction, that includes machine-readable instructions for controlling a functionality of the computer.

A computer may comprise an interface for connecting to the network, wherein the network may be a private or public network, and in particular the Internet or another communication network. Depending on the embodiment, this connection may also be established via a mobile communication network.

A computer system may, for example, be a mobile telecommunications device, and in particular a smart phone, a portable computer, such as a laptop or palmtop computer, a personal digital assistant or the like. Furthermore, this may be a smart watch or smart glasses, for example. Moreover, this may be a stationary computer system, such as a personal computer, for example, or a server integrated in a client server environment. In particular, this may be a server comprising a database management system, which manages a data including data.

A "storage device" or "data storage device" here shall be understood to mean both volatile and non-volatile electronic storage devices, and digital storage media.

A "non-volatile memory" here shall be understood to mean an electronic storage device for permanently storing data. A non-volatile memory may be configured as a non-changeable memory, which is also referred to as ready-only memory (ROM) or as a changeable memory, which is referred to simply as a non-volatile memory (NVM). In particular, this may be an EEPROM, for example a flash EEPROM, referred to as flash for short. A non-volatile memory is characterized in that the data stored therein is preserved even after the power supply is turned off.

A "volatile electronic storage device" here shall be understood to mean a storage device for temporarily storing data, which is characterized in that all the data is lost after the power supply is turned off. In particular, this may be a volatile direct access memory, which is also referred to as random access memory (RAM), or a volatile main memory of the processor.

A "processor" here and hereafter shall be understood to mean a logic circuit used to execute program instructions. The logic circuit may be implemented on one or more discrete components, and in particular on a chip. In particular, a "processor" shall be understood to mean a microprocessor or a microprocessor system comprising multiple processor cores and/or multiple microprocessors.

An "interface" or "communication interface" here shall be understood to mean an interface via which data may be received and sent, wherein the communication interface may be configured to be equipped with contacts or in a contactless manner. The communication interface may be an internal interface or an external interface, which is connected to an associated device by means of a cable or wirelessly, for example. A communication interface for wireless communication shall be understood to mean a communication interface configured to send and receive data in a contactless manner. The communication may take place according to an RFID and/or NFC standard, such as Bluetooth, for example. Furthermore, the communication interface may be configured for communicating via a local wireless network, for example according to a standard of the IEEE-802.11 family and/or Wifi.

An interface may be configured as a wireless interface, for example, which enables communication via a digital cellular mobile communication network, which may composed according to a wireless communication standard, such as GSM, UMTS, LTE, CDMA or another standard.

Communication may generally take place via a network, for example. A "network" here shall be understood to mean any transmission medium having a connection for communication which enables communication between at least two computer systems. A network may, for example, encompass a local network, in particular a local area network (LAN), a private network, in particular an Intranet, or a virtual private network (VPN). For example, the computer system may comprise a standard radio interface for connection to a WLAN. Furthermore, it may be a public network, such as the Internet.

Embodiments include a telecommunications system, which comprises the aforementioned electronic data storage system and a communication interface for communicating via a network, wherein the data to be stored includes data characterizing a processing operation of a digitally encoded document, the provision of the blockchain structure including receiving the document to be processed, which includes the blockchain structure, and reading out the blockchain structure from the received document, the provision of the data to be stored including processing the received document and generating the data, and the storage of the expanded blockchain structure including adding the expanded blockchain structure to the processed document and storing the processed document including the expanded blockchain structure, the carried-out method furthermore comprising:

receiving a request for the processed document by way of a communication interface via the network from a requesting telecommunications system; and transmitting the processed document including the expanded blockchain structure by way of the communication interface via the network to the requesting telecommunications system in response to the received request.

According to embodiments, the transmission of the digitally encoded document takes place in response to a receipt of a request for transmission. For example, the digitally encoded document is an HTML document. For example, the digitally encoded document is provided on an Internet platform, for example as a website or as a posting. A posting here shall be understood to mean an individual article on an Internet platform, such as a social media platform, on a web forum or a blog. Furthermore, the digitally encoded document may be provided for downloading. For example, a website or a posting includes a link for accessing the digitally encoded document.

In response to an appropriate request, such as in the form of a HTTP GET request, the digitally encoded document is transmitted to the requesting computer system.

According to alternative embodiments, the transmission of the digitally encoded document takes place independently from a request for transmission. For example, the document is transmitted in the form of an e-mail, an instant message, a sound message, a video message, an image message, an SMS message or an MMS message or is encompassed by one of the aforementioned message types. Instant messaging denotes a communication method in which two or more users communicate with one another by digitally encoded text, voice, image and/or video messages. The sender triggers the transmission of the message, that is, a so-called push method is employed, so that the messages are received by the intended recipient as directly as possible. The users are connected to one another directly or by a server by way of a computer program via a network, such as the Internet.

Embodiments of the invention will be described in more detail hereafter with reference to the drawings. In the drawings.

Elements of the following embodiments that correspond to each other are denoted by the same reference numerals.

Figure 1:
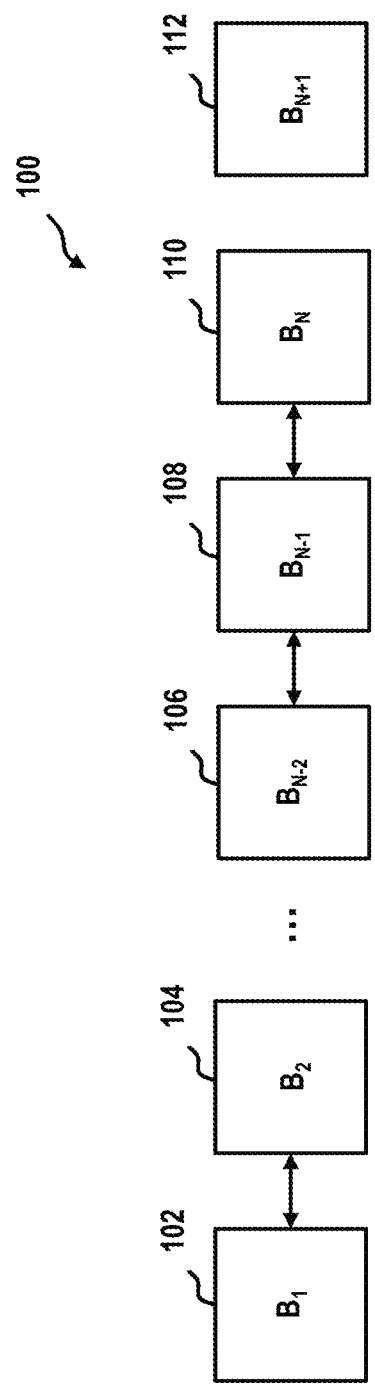
FIG. 1 shows a schematic block diagram of one embodiment of an exemplary blockchain structure.

FIG. 1 shows an embodiment of an exemplary blockchain structure 100, which includes N blocks 102, 104, 106, 108, 110. The blockchain structure 100 is to be expanded by an additional block 112. The blocks 102, 104, 106, 108, 110 of the blockchain structure 100 are bidirectionally linked to one another by check values. The individual bidirectional links are schematically indicated by double arrows. The inner blocks 104, 106, 108 of the blockchain structure 100 each include at least two check values, which are hash values, for example. A first of these check values is dependent on the data of the corresponding inner block and on the data of the immediately following block, for example. A second of these check values is dependent on the data of the corresponding inner block and on the data of the immediately preceding block, for example. The first and second check values are combined with one another, for example, in a shared hash value. The corresponding check values are integrated into the blocks. The check value for linking the penultimate block 108 of the blockchain structure 100 to the last block 110 thus includes both data stored in the penultimate block 108 and data stored in the last block 110. The check value stored in the penultimate block 108 and that stored in the last block 110 thus only represent correct hash values of the two corresponding blocks as long as the data of the two blocks is not altered. In the event of tampering, for example, with the last block 110, the check value of the penultimate block 108 no longer matches the data of the last block 110, making the tampering evident.

Figure 2A:
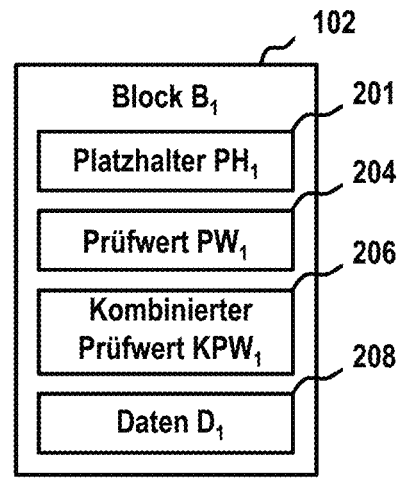
FIGS. 2A and 2B show schematic block diagrams of first embodiments of a first block of the blockchain structure from FIG. 1.

FIG. 2A shows a schematic block diagram of a first embodiment of the first block $B_1$ 102 from FIG. 1. The block $B_1$ 102 includes a placeholder $PH_1$ 201, which identifies the block $B_1$ 102 as the first block of the blockchain structure 100. This placeholder $PH_1$ 201 is not intended to be replaced with another value when the blockchain structure 100 is expanded. Rather, the placeholder $PH_1$ 201 remains, since the block $B_1$ 102 is intended to remain unchanged the first block of the blockchain structure 100.

Furthermore, the block $B_1$ 102 includes a check value $PW_1$ 204, which is, for example, a hash value of a combination of the data $D_1$ 208 stored in the block $B_1$ 102 and the data $D_2$ stored in the second block 104. For example, the check value $PW_1$ 204 is calculated as follows:

$$PW_1 = \text{Hash}\{D_2 + \text{Hash}[D_1 + PH_1]\}.$$

The block $B_1$ 102 moreover includes a combined check value $KPW_1$ 206, which is a hash value of a combination of the placeholder $PH_1$ 201 and of the check value $PW_1$ 204, for example. In other words, the combined check value $KPW_1$ 206 is a multiply hashed hash value, which was calculated using the data $D_1$ of the first block $B_1$ 102 and the data $D_2$ of the second block $B_2$ 104 of the blockchain structure 100 and thus links these two blocks 102, 104 to one another. The combined check value $KPW_1$ 206 is calculated as follows, for example:

$$KPW_1 = \text{Hash}\{PH_1 + PW_1\}.$$

Figure 2B:
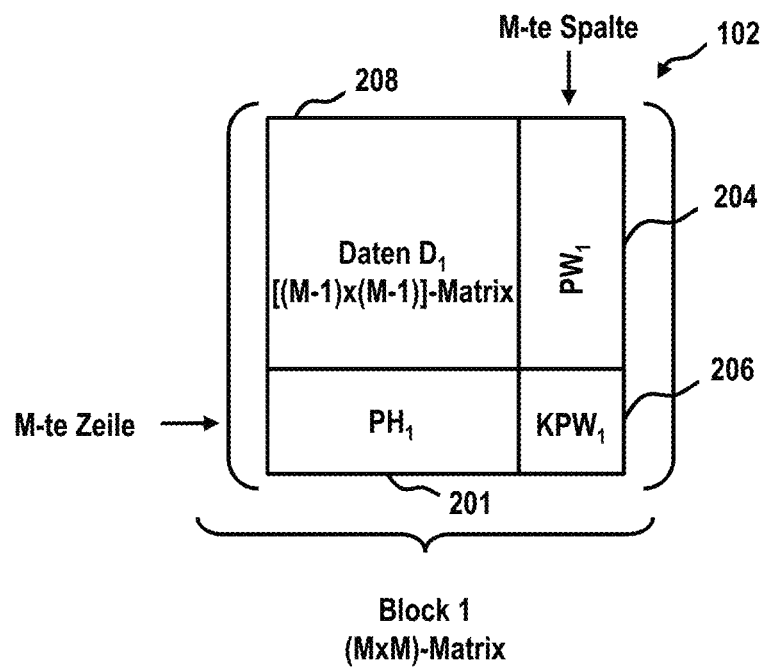

FIG. 2B shows a schematic block diagram of a further embodiment of the first block $B_1$ 102 from FIG. 2A. The block $B_1$ 102 is structured in the form of a square (M×M) matrix, for example. The data $D_1$ of the block $B_1$ 102 is stored in entries of a square [(M−1)×(M−1)] matrix 208. The placeholder $PH_1$ 201 is stored in the Mth row of the (M×M) matrix, for example. The check value $PW_1$ 204 is stored in the Mth column of the (M×M) matrix, for example. The combined check value $KPW_1$ 206 is stored in the element $a_{MM}$ of the (M×M) matrix, for example. According to embodiments, the placeholder $PH_1$ 201 consists exclusively of zeros, so that all elements $a_{iM}$ of the (M×M) matrix with $1 \leq i < M$ are set to zero.

Figure 3A:
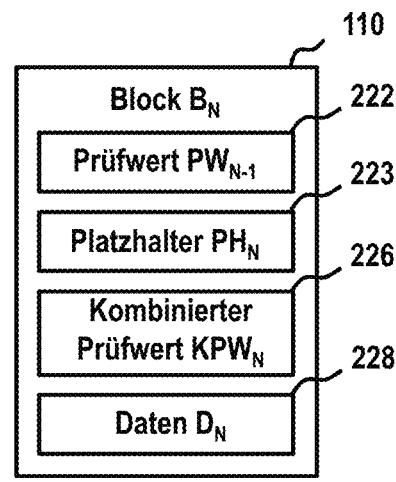
FIGS. 3A and 3B show schematic block diagrams of first embodiments of a last block of the blockchain structure from FIG. 1.

FIG. 3A shows a schematic block diagram of a first embodiment of the last block $B_N$ 110 of the blockchain structure 100 from FIG. 1 before the blockchain structure 100 is expanded by the additional block $B_{N+1}$ 112. The last block $B_N$ 110 of the blockchain structure 100 is the Nth block of the blockchain structure 100. The block $B_N$ 110 includes a placeholder $PH_N$ 223, which identifies the block $B_N$ 110 as the last block of the blockchain structure 100. This placeholder $PH_N$ 223 is intended to be replaced with a check value of a bidirectional link to the additional block $B_{N+1}$ when the blockchain structure 100 is expanded.

Furthermore, the block $B_N$ 110 includes a check value $PW_{N-1}$ 222, which is, for example, a hash value of a combination of the data $D_{N-1}$ stored in the penultimate block $B_{N-1}$ 108 and the data $D_N$ stored in the last block $B_N$ 110. For example, the check value $PW_{N-1}$ 222 of the last block $B_N$ 110 is calculated as follows:

$$PW_{N-1}=\text{Hash}\{D_N+\text{Hash}[D_{N-1}+PW_{N-2}]\},$$

where $PW_{N-2}$ denotes a check value of the penultimate block $B_{N-2}$ 106, which may be calculated analogously to the check value $PW_{N-1}$ 222 of the last block $B_N$ 110 following the above-described recursive formula.

The block $B_N$ 110 moreover includes a combined check value $KPW_N$ 226, which is a hash value of a combination of the placeholder $PH_N$ 223 and of the check value $PW_{N-1}$ 222, for example. In other words, the combined check value $KPW_N$ 226 is a multiply hashed hash value, which was calculated using the data $D_{N-1}$ of the penultimate block $B_{N-1}$ 108 and the data $D_N$ of the last block $B_N$ 110 of the blockchain structure 100 and thus links these two blocks 108, 110 to one another. The combined check value $KPW_N$ 226 is calculated as follows, for example:

$$KPW_N=\text{Hash}\{PW_{N-1}+PH_N\},$$

as long as the block $B_N$ 110 is the last block of the blockchain structure 100, and the placeholder $PH_N$ 223, which identifies the block $B_N$ 110 as the last block, has not yet been replaced with a check value of a further bidirectional link to an additional block $B_{N+1}$ 112.

Figure 3B:
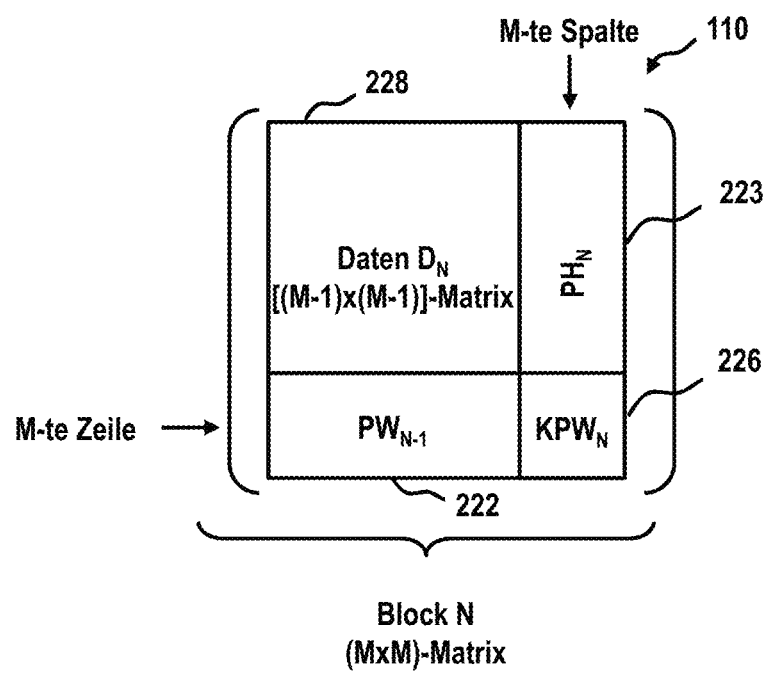

FIG. 3B shows a schematic block diagram of a further embodiment of the last block $B_N$ 110 from FIG. 3A. The block $B_N$ 110 is structured in the form of a square (M×M) matrix, for example. The data $D_N$ of the block $B_N$ 110 is stored in entries of a square $[(M-1)\times(M-1)]$ matrix 228. The placeholder $PH_N$ 223 is stored in the Mth column of the (M×M) matrix, for example. The check value $PW_N$ 222 is stored in the Mth row of the (M×M) matrix, for example. The combined check value $KPW_N$ 226 is stored in the element $a_{MM}$ of the (M×M) matrix, for example. According to embodiments, the placeholder $PH_N$ 223 consists exclusively of zeros, so that all elements $a_{Mi}$ of the (M×M) matrix with $1 \leq i < M$ are set to zero.

According to embodiments, the check value that implements a bidirectional link to a preceding block is stored in the Mth row of the (M×M) matrix structure, whereas the check value that implements a bidirectional link to a subsequent block is stored in the Mth column of the (M×M) matrix structure. Each block that is bidirectionally linked to two blocks, that is, a preceding block and a subsequent block, thus includes a check value for each of the two links. According to embodiments, the block furthermore includes a combined check value, which includes a hash value of a combination of the two check values of the two bidirectional links. If the corresponding block is the first or last block 102, 110 of the blockchain structure 100, that is, a block that is only bidirectionally linked to one further block (the second block 104 or the penultimate block 108), the block includes a check value that implements a bidirectional link, and a placeholder for a further check value of a further potential bidirectional link to another block. This placeholder identifies the corresponding block as the first or last block of the blockchain structure. The combined check value of the corresponding block includes the check value of the corresponding one bidirectional link and the placeholder. The combined check value is based on a multiple application of the hash function.

Figure 4A:
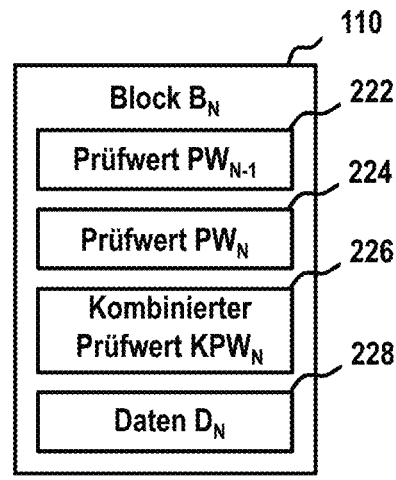
FIGS. 4A and 4B show schematic block diagrams of first embodiments of the last block of the blockchain structure from FIG. 1.
Figure 4B:
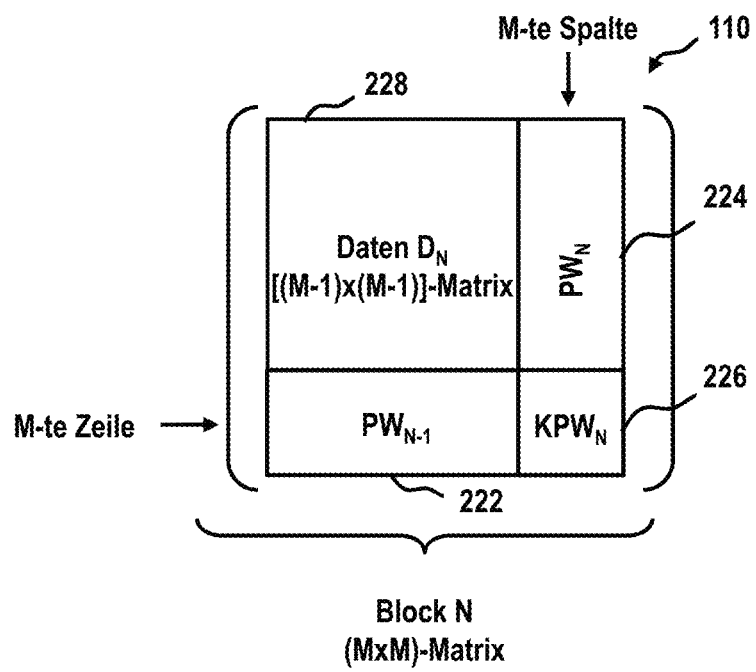

FIGS. 4A and 4B show schematic block diagrams of the embodiments of the last block $B_N$ 110 of the blockchain structure 100 from FIG. 3A or 3B after the blockchain structure 100 has been expanded by the additional block $B_{N+1}$ 112, so that the expanded blockchain structure 100 comprises N+1 blocks. The additional block Block $B_{N+1}$ 112 is thus the new last block of the blockchain structure 100, whereas the existing last block Block $B_N$ 110 is the penultimate block of the expanded blockchain structure 100.

So as to expand the blockchain structure 100 by the additional block $B_{N+1}$ 112, the last block $B_N$ 110 is bidirectionally linked to the additional block $B_{N+1}$ 112. A check value $PW_N$ 224 is calculated in the process, which is, for example, a hash value of a combination of the data $D_N$ 228 stored in the last block $B_N$ 110 and the data $D_{N+1}$ to be stored in the additional block $B_{N+1}$ 112. For example, the check value $PW_N$ 224 of the last block $B_N$ 110 is calculated as follows:

$$PW_N=\text{Hash}\{D_{N+1}+\text{Hash}[D_N+PW_{N-1}]\}.$$

The placeholder $PH_N$ is replaced with the check value $PW_N$ 224, and the combined check value $KPW_N$ 226 is updated. For example, the updated combined check value $KPW_N$ 226 is calculated as follows:

$$KPW_N=\text{Hash}\{PW_{N-1}+PW_N\}=\text{Hash}\{PW_{N-1}+\text{Hash}\{D_{N+1}+\text{Hash}[D_N+PW_{N-1}]\}\}.$$

The combined check value $KPW_N$ 226 thus includes data $D_N$ 228 of the last block $B_N$ 110 and data $D_{N+1}$ of the additional block $B_{N+1}$ 112. Due to the recursion of the aforementioned formula, the combined check value $KPW_N$ 226 is furthermore dependent on the data of all preceding blocks of the blockchain structure 100.

Figure 5A:
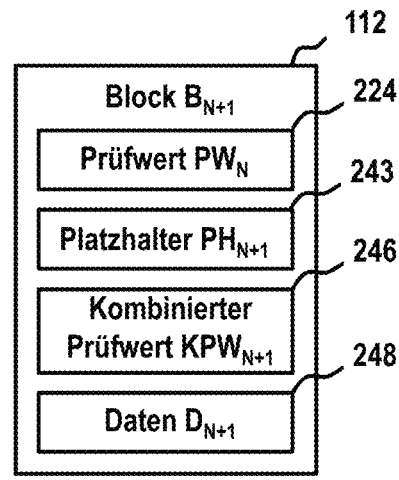
FIGS. 5A and 5B show schematic block diagrams of first embodiments of an additional block of the blockchain structure from FIG. 1.

FIG. 5A shows a schematic block diagram of a first embodiment of the additional block $B_{N+1}$ 112 of the blockchain structure 100 from FIG. 1 after the blockchain structure 100 has been expanded by the additional block $B_{N+1}$ 112. The additional block $B_{N+1}$ 112 of the blockchain structure 100 is the (N+1)th block of the expanded blockchain structure 100. The block $B_{N+1}$ 112 includes a placeholder $PH_{N+1}$ 243, which identifies the block $B_{N+1}$ 112 as the last block of the expanded blockchain structure 100.

This placeholder $PH_{N+1}$ 243 is intended to be replaced with a check value of a bidirectional link in the event of an additional expansion of the blockchain structure 100.

The block $B_{N+1}$ 112 furthermore includes the check value $PW_N$ 224 of the bidirectional link between block $B_N$ 110 and block $B_{N+1}$ 112. The block $B_{N+1}$ 112 moreover includes a combined check value $KPW_{N+1}$ 246, which is a hash value of a combination of the placeholder $PH_{N+1}$ 243 and of the check value $PW_N$ 224, for example. In other words, the combined check value $KPW_{N+1}$ 246 is a multiply hashed hash value, which is calculated using the data $D_N$ of the block $B_N$ 110 and the data $D_{N+1}$ of the additional block $B_{N+1}$ 112. The combined check value $KPW_{N+1}$ 246 is calculated as follows, for example:

$$KPW_{N+1}=\text{Hash}\{PW_N+PH_{N+1}\}.$$

The block is the last block $B_{N+1}$ 112 of the blockchain structure 100 in this case. If the placeholder $PH_{N+1}$ 243 is replaced with a check value in the course of an expansion of the blockchain structure 100, the combined check value $KPW_{N+1}$ 246 is replaced with an updated combined check value $KPW_{N+1}$ 246, which is calculated using the check value that replaces the placeholder $PH_{N+1}$ 243.

Figure 5B:
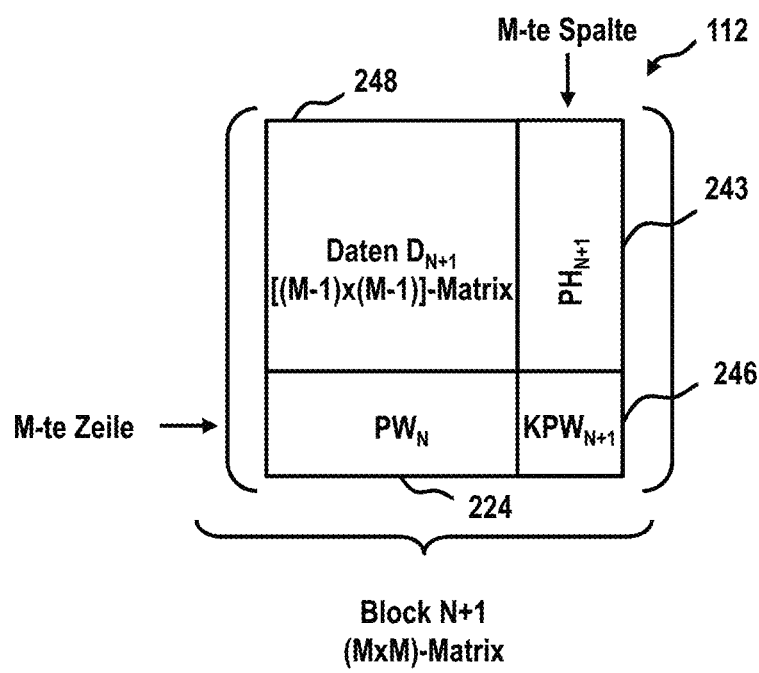

FIG. 5B shows a schematic block diagram of a further embodiment of the additional block $B_{N+1}$ 112 from FIG. 5A. The block $B_{N+1}$ 112 is structured in the form of a square (M×M) matrix, for example. The data $D_{N+1}$ of the block $B_{N+1}$ 112 is stored in entries of a square [(M−1)×(M−1)] matrix 248. The placeholder $PH_{N+1}$ 243 is stored in the Mth column of the (M×M) matrix, for example. The check value $PW_{N+1}$ 224 is stored in the Mth row of the (M×M) matrix, for example. The combined check value $KPW_{N+1}$ 246 is stored in the element $a_{MM}$ of (M×M) matrix, for example. According to embodiments, the placeholder $PH_{N+1}$ 243 consists exclusively of zeros, so that all elements $a_{Mi}$ of the (M×M) matrix with $1 \leq i < M$ are set to zero.

According to embodiments, consecutive blocks are each provided with an identical check value for implementing the bidirectional link, for example, the block $B_N$ 110 and the block $B_{N+1}$ 112 are each provided with the identical check value $PW_{N+1}$ 224.

Figure 6:
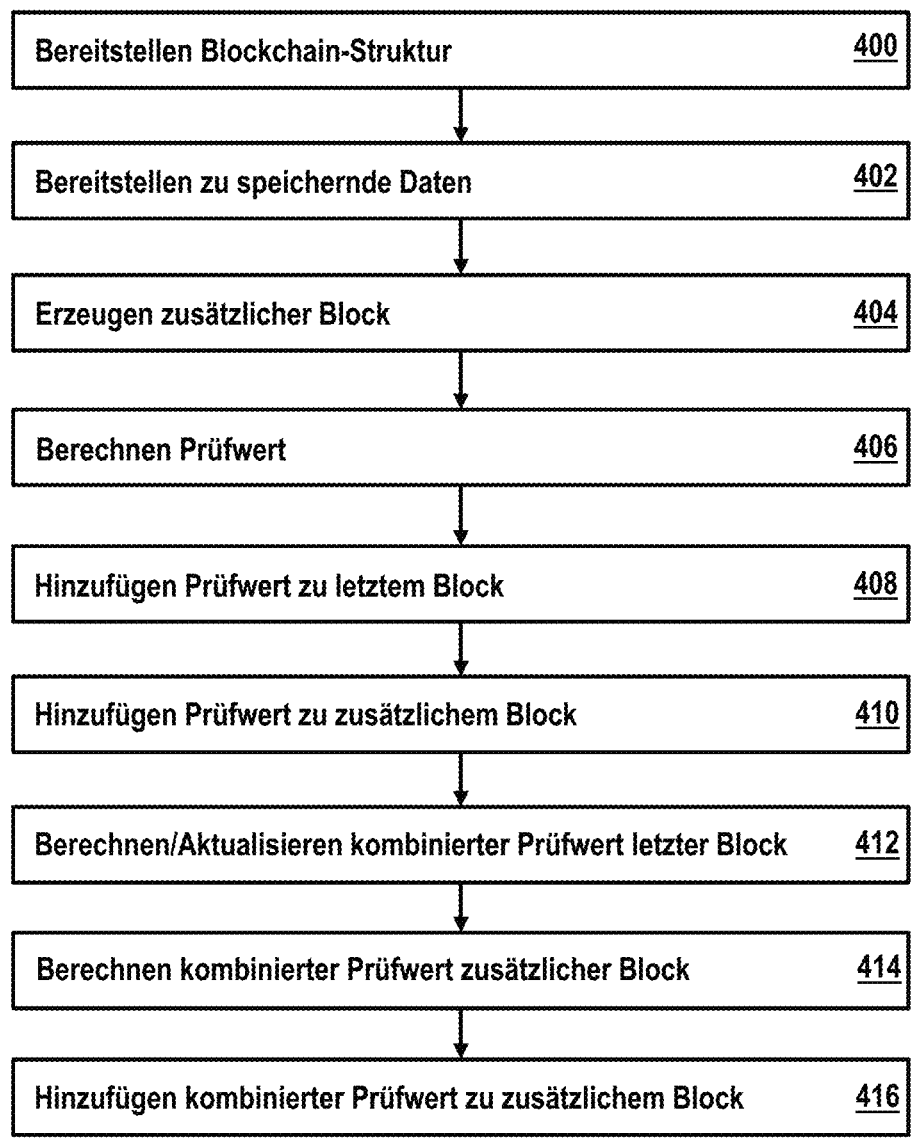
FIG. 6 shows a schematic flow chart of a first exemplary method for adding an additional block.

FIG. 6 shows a schematic flow chart of an exemplary method for adding an additional block to a bidirectionally linked blockchain structure. In step 400, a bidirectionally linked blockchain structure is provided. In step 402, data to be stored is provided. In step 404, an additional block is generated for the blockchain structure. For example, the additional block has the form of an (M×M) matrix. Prior to the bidirectional link to the blockchain structure, the matrix of the additional block includes a respective placeholder in the Mth row and the Mth column, for example For example, the entries in the Mth row and the Mth column only include zeros. The data to be stored is stored in the matrix elements of the remaining [(M−1)×(M−1)] submatrix. In step 406, the check value $PW_N$ of the bidirectional link is calculated. For example, the check value $PW_N$ includes a hash value of a combination of the data $D_N$ stored in the last block $B_N$ and the data $D_{N+1}$ to be stored in the additional block $B_{N+1}$. Moreover, the check value $PW_{N-1}$ of the prior block $B_{N-1}$ is incorporated in the check value $PW_N$. According to embodiments, the check value $PW_{N-1}$ of the prior block $B_{N-1}$ is provided in the Mth row of the last block $B_N$. For example, the check value $PW_N$ of the last block $B_N$ is calculated as follows:

$$PW_N=\text{Hash}\{D_{N+1}+\text{Hash}[D_N+PW_{N-1}]\}.$$

In step 408, the check value $PW_N$ is added to the last block $B_N$. This is written to the Mth column, for example. In step 410, the check value $PW_N$ is added to the additional block $B_{N+1}$. This is written to the Mth row, for example. In step 412, the combined check value $KPW_N$ of the last block $B_N$ is newly calculated using the check value $PW_N$, and the matrix element $a_{MM}$ storing the combined check value $KPW_N$ is updated therewith. For example, the updated combined check value $KPW_N$ is calculated as follows from the entries of the Mth row and the Mth column of the last block $B_N$:

$$KPW_N=\text{Hash}\{PW_{N-1}+PW_N\}.$$

In step 414, the combined check value $KPW_{N+1}$ of the additional block $B_{N+1}$ is calculated, using the check value $PW_N$. For example, the combined check value $KPW_{N+1}$ is calculated as follows from the entries of the Mth row (check value $PW_N$) and the Mth column (placeholder $PH_N$) of the additional block $B_{N+1}$:

$$KPW_{N+1}=\text{Hash}\{PW_N+PH_{N+1}\}.$$

In step 416, for example, the combined check value $KPW_{N+1}$ is stored in the matrix element $a_{MM}$ of the additional block $B_{N+1}$. As a result, the two blocks $B_N$ and $B_{N+1}$ are bidirectionally linked to one another, and the blockchain structure is expanded by the additional block $B_{N+1}$. This method is repeated for each block to be additionally attached.

Figure 7:
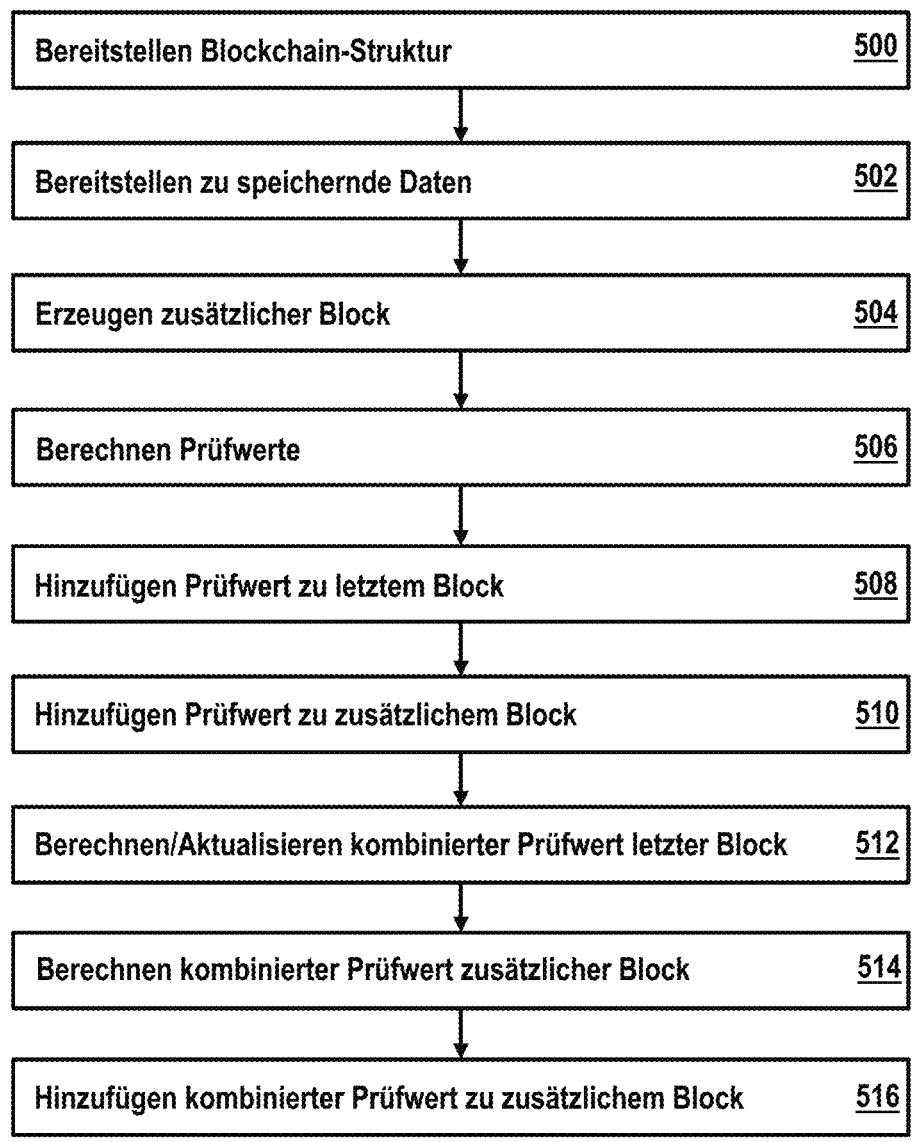
FIG. 7 shows a schematic flow chart of a second exemplary method for adding an additional block.
Figure 8A:
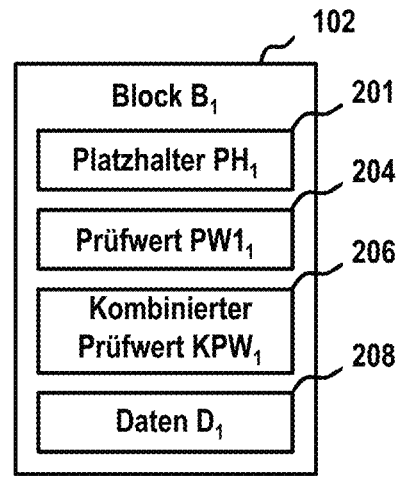
FIGS. 8A and 8B show schematic block diagrams of second embodiments of a first block of the blockchain structure from FIG. 1.
Figure 8B:
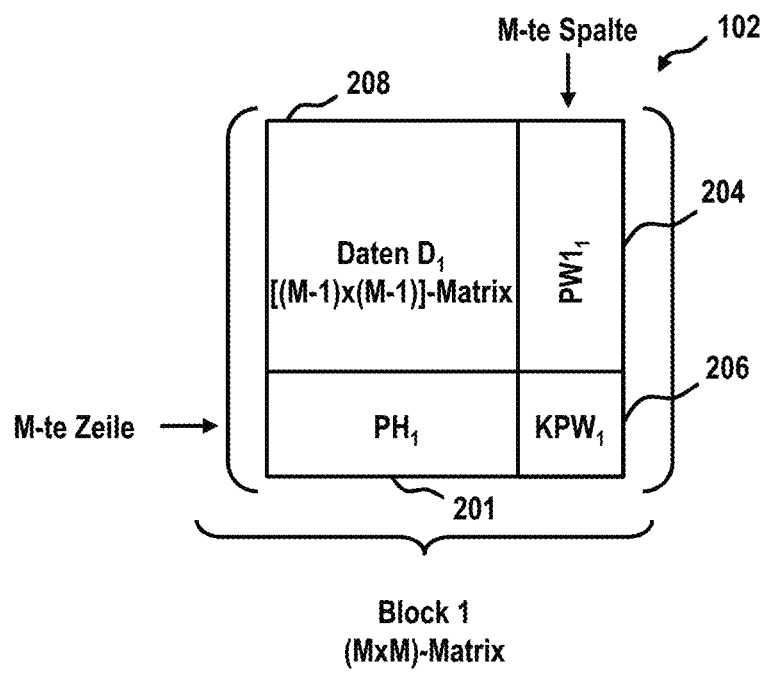
Figure 9A:
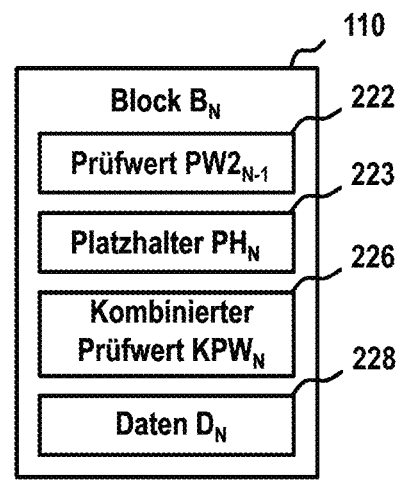
FIGS. 9A and 9B show schematic block diagrams of second embodiments of a last block of the blockchain structure from FIG. 1.
Figure 9B:
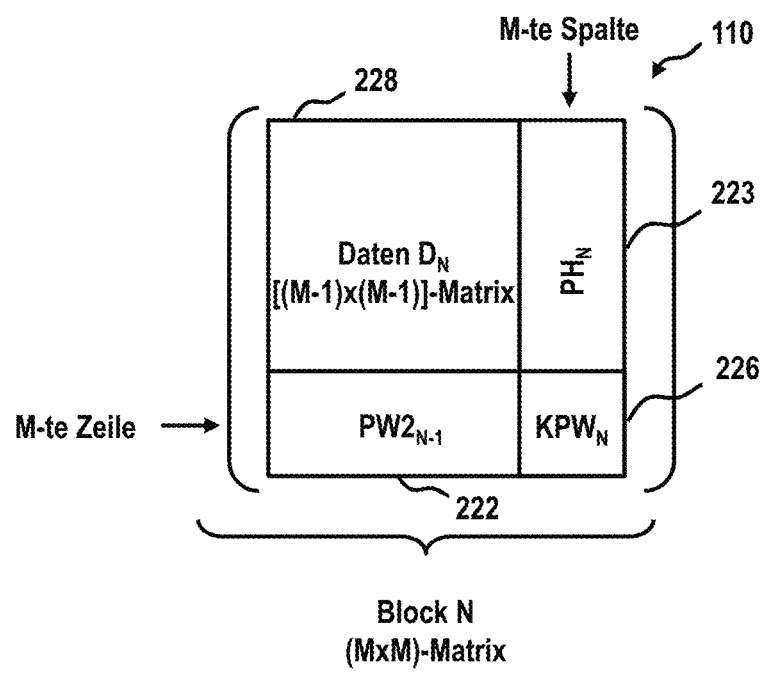
Figure 10A:
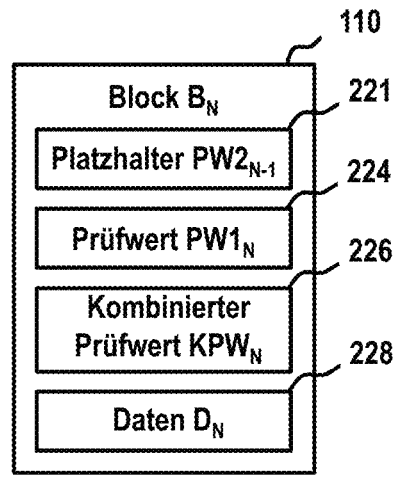
FIGS. 10A and 10B show schematic block diagrams of second embodiments of the last block of the blockchain structure from FIG. 1.
Figure 10B:
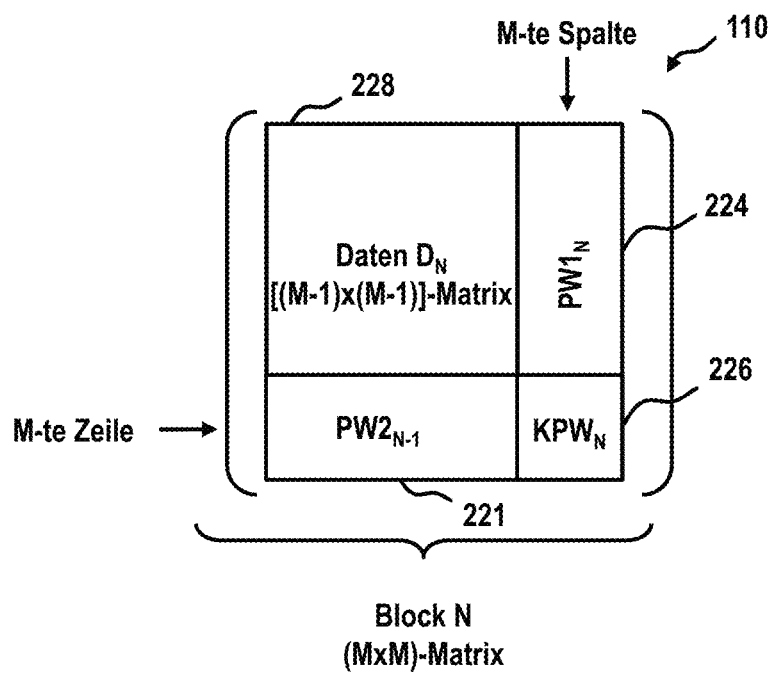
Figure 11A:
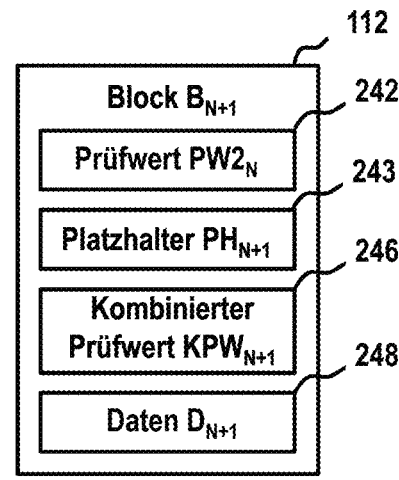
FIGS. 11A and 11B show schematic block diagrams of second embodiments of an additional block of the blockchain structure from FIG. 1.
Figure 11B:
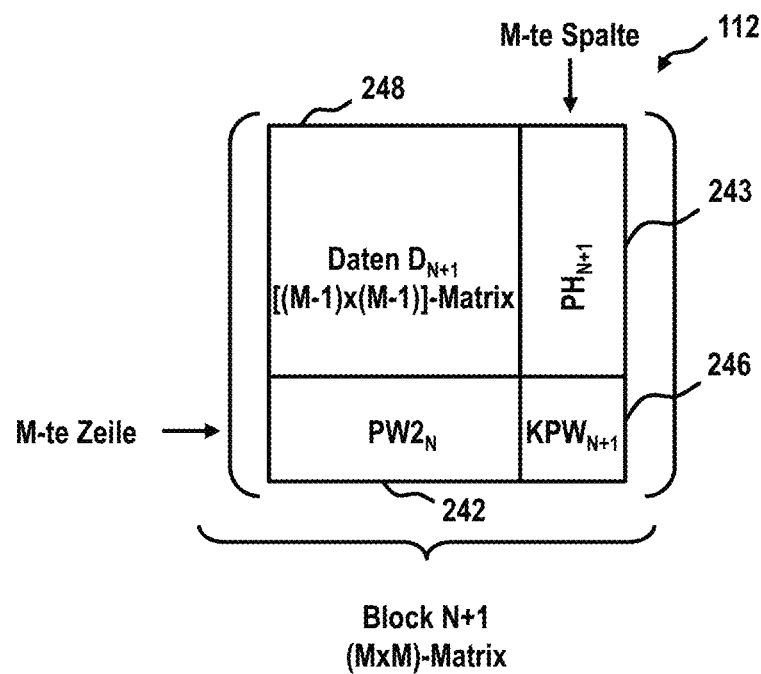

FIGS. 8 to 11 correspond to FIGS. 2 to 5 and show second embodiments of the blocks of the blockchain structure 100 from FIG. 1 in the case of an alternative linking process for creating bidirectional links according to FIG. 7. FIG. 7 shows the corresponding method in the form of a schematic flow chart. The steps 500 to 504 correspond to the steps 400 to 404 from FIG. 6. In step 506, check values of the bidirectional link between the blocks $B_N$ and $B_{N+1}$ are calculated. A check value $PW1_N$ is calculated in this case for the last block $B_N$, and a check value $PW2_N$ is calculated for the last block $B_{N+1}$. First, a matrix operation is carried out, using the two submatrices $D_N$ and $D_{N+1}$, which include the stored data of the blocks $B_N$ and $B_{N+1}$. For example, a matrix multiplication $D_N * D_{N+1}$ is carried out. The resulting unambiguous matrix is used as input for a hash function Hash $(D_N * D_{N+1})$. As a result of the mathematical unambiguousness of the matrix multiplication, it is possible to ensure that tampering with the data $D_N$ in the block $B_N$ as well as tampering with the data $D_{N+1}$ in $B_{N+1}$ manifests itself in an alteration of the hash value Hash$(D_N * D_{N+1})$. The resulting hash value is split in two, for example according to the formula:

$$\text{Hash}\{D_N * D_{N+1}\}=PW1_N+PW2_N.$$

In step 508, the check value $PW1_N$ for the last block $B_N$ is added to the same, for example, written to the Mth column of the block $B_N$. In step 510, the check value $PW2_N$ for the additional block $B_{N+1}$ is added to the same, for example written to the Mth column of the block $B_N$.

In step 512, the combined check value $KPW_N$ of the last block $B_N$ is newly calculated using the check value $PW_N$, and the matrix element $a_{MM}$ storing the combined check value $KPW_N$ is updated with the newly calculated check value $PW_N$. For example, the updated combined check value $KPW_N$ is calculated as follows from the entries of the Mth row and the Mth column of the last block $B_N$:

$$KPW_N=\text{Hash}\{PW2_{N-1}+PW1_N\}.$$

In step 514, the combined check value $KPW_{N+1}$ of the additional block $B_{N+1}$ is calculated using the check value $PW2_N$ of the additional block $B_{N+1}$. For example, the combined check value $KPW_{N+1}$ is calculated as follows from the entries of the Mth row (check value $PW2_N$) and the Mth column (placeholder $PH_N$) of the additional block $B_{N+1}$:

$$KPW_{N+1}=\text{Hash}\{PW2_N+PH_{N+1}\}.$$

In step 516, for example, the combined check value $KPW_{N+1}$ is stored in the matrix element $a_{MM}$ of the additional block $B_{N+1}$. As a result, the two blocks $B_N$ and $B_{N+1}$ are bidirectionally linked to one another, and the blockchain structure is expanded by the additional block $B_{N+1}$. This method is repeated for each block to be additionally attached.

FIGS. 8 to 11 show schematic second embodiments of the first block $B_1$ 102, of the last block $B_N$ 110, and of the additional block $B_{N+1}$ 112 of the blockchain structure 100 from FIG. 1. The blocks 102, 110, 112 shown in FIGS. 8 to 11 essentially correspond to the blocks 102, 110, 112 shown in FIGS. 2 to 6. However, the blocks 102, 110, 112 of FIGS. 8 to 11 differ by having been created using the method from FIG. 7. The check values that are used to generate the bidirectional links between consecutive blocks are thus, in general, not identical, but differ from one another. For example, the first block $B_1$ of FIGS. 8A and 8B includes a check value $PW1_1$ 204, which is assigned to the first block $B_1$. This check value $PW1_1$ 204 was calculated together with a check value $PW2_1$ assigned to the second block $B_2$ 104 of the blockchain structure 100 from the data $D_1$ and $D_2$ of the first and second blocks, using the method from FIG. 7. The last block $B_N$ 110 of FIGS. 9A and 9B as well as 10A and 10B includes a check value $PW2_{N-1}$ 222 assigned to the last block $B_N$ 110, which was calculated together with a check value $PW1_{N-1}$ assigned to the penultimate block $B_{N-1}$ 108 of the blockchain structure 100 from the data $D_{N-1}$ and $D_N$ of the penultimate and last blocks, using the method from FIG. 7. Furthermore, the check value $PW1_N$ 224 of the last block $B_N$ 110 shown in FIGS. 10A and 10B is calculated together with the check value $PW2_N$ 242 of the additional block $B_N$ 112 shown in FIGS. 11A and 11B. The method from FIG. 7 is applied to the data $D_N$ of the last block $B_N$ 110 and the data of the additional block $B_N$ 112 in the process, which are combined, for example, using a matrix multiplication.

The combined check values $KPW_1$ 206, $KPW_N$ 226, $KPW_{N+1}$ 246 of the blocks $B_1$ 102, $B_N$ 110, $B_{N+1}$ 112 shown in FIGS. 8 to 11 are calculated analogously to the combined check values $KPW_1$ 206, $KPW_N$ 226, $KPW_{N+1}$ 246 of FIGS. 2 to 6. This means that the combined check value $KPW_1$ 206 in FIGS. 8A and 8B was calculated as $KPW_1=\text{Hash}\{PH_1+PW1_1\}$. The combined check value $KPW_N$ 226 in FIGS. 9A and 9B was calculated as $KPW_N=\text{Hash}\{PW2_{N-1}+PH_N\}$. The combined check value $KPW_N$ 226 in FIGS. 10A and 10B is calculated in the course of the bidirectional link of the blocks $B_N$ 110 and $B_{N+1}$ 112 as $KPW_N=\text{Hash}\{PW2_{N-1}+PW1_N\}$. Finally, the combined check value $KPW_{N+1}$ 246 in FIGS. 11A and 11B is calculated as $KPW_{N+1}=\text{Hash}\{PW2_N+PH_{N+1}\}$.

According to embodiments, the check values that are used to generate the bidirectional links between consecutive blocks may also be identical.

This depends on whether the hash value of the matrix multiplication is divided symmetrically (identical check values) or asymmetrically (different check values).

Figure 12:
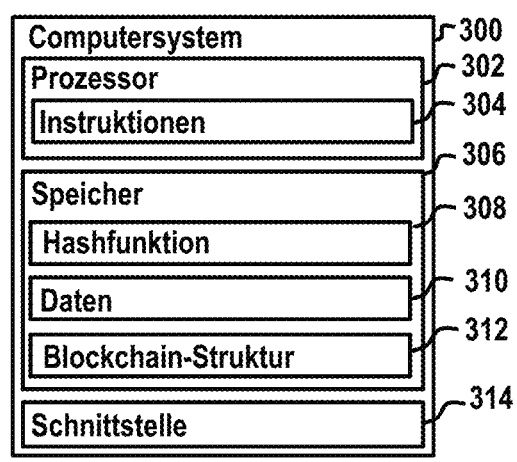
FIG. 12 shows a schematic block diagram of one embodiment of an exemplary data storage system.

FIG. 12 shows a schematic block diagram of one embodiment of an exemplary data storage system 300 in the form of a computer system for storing data 310 in a tamper-proof manner in an electronic storage device 306, using a bidirectionally linked blockchain structure 312.

The computer system 300 comprises a processor 302 which is configured to execute program instructions 304. By executing the program instructions 304, the processor 302 controls the computer system 300 as to carry out one of the above-described embodiments of the method for storing data in a tamper-proof manner.

The computer system 300 furthermore comprises a storage device 306 in which a hash function 308 for calculating hash values and the bidirectionally linked blockchain structure 312 are stored. The storage device 306 moreover includes data 310, which is to be protected against manipulation or stored in a tamper-proof manner, using a bidirectionally linked blockchain structure 312. For example, the computer system 300 carries out one of the methods from FIG. 6 or 7 and generates an additional block for the blockchain structure 312, which includes the data 310 to be stored in a tamper-proof manner and is being bidirectionally linked to the last block of the blockchain structure 312. For the bidirectional link of the additional block, for example, hash values are calculated using the hash function 308, which include the data 310 and data from the blockchain structure 312, and in particular data of the last block of the blockchain structure 312.

Finally, the computer system 300 comprises a communication interface 314. For example, this communication interface 314 may be a network interface for communicating via a network or an interface for communicating with a removable medium. The data 310 and/or the blockchain structure 312 may be provided via the communication interface 314, for example. The communication interface 314 may furthermore be a user interface for entering commands by a user and/or for outputting results.

According to embodiments, the program instructions 304 may include a database management system, for example, which manages blockchain structures, such as blockchain structure 312, stored in the storage device 306, for example.

Figure 13:
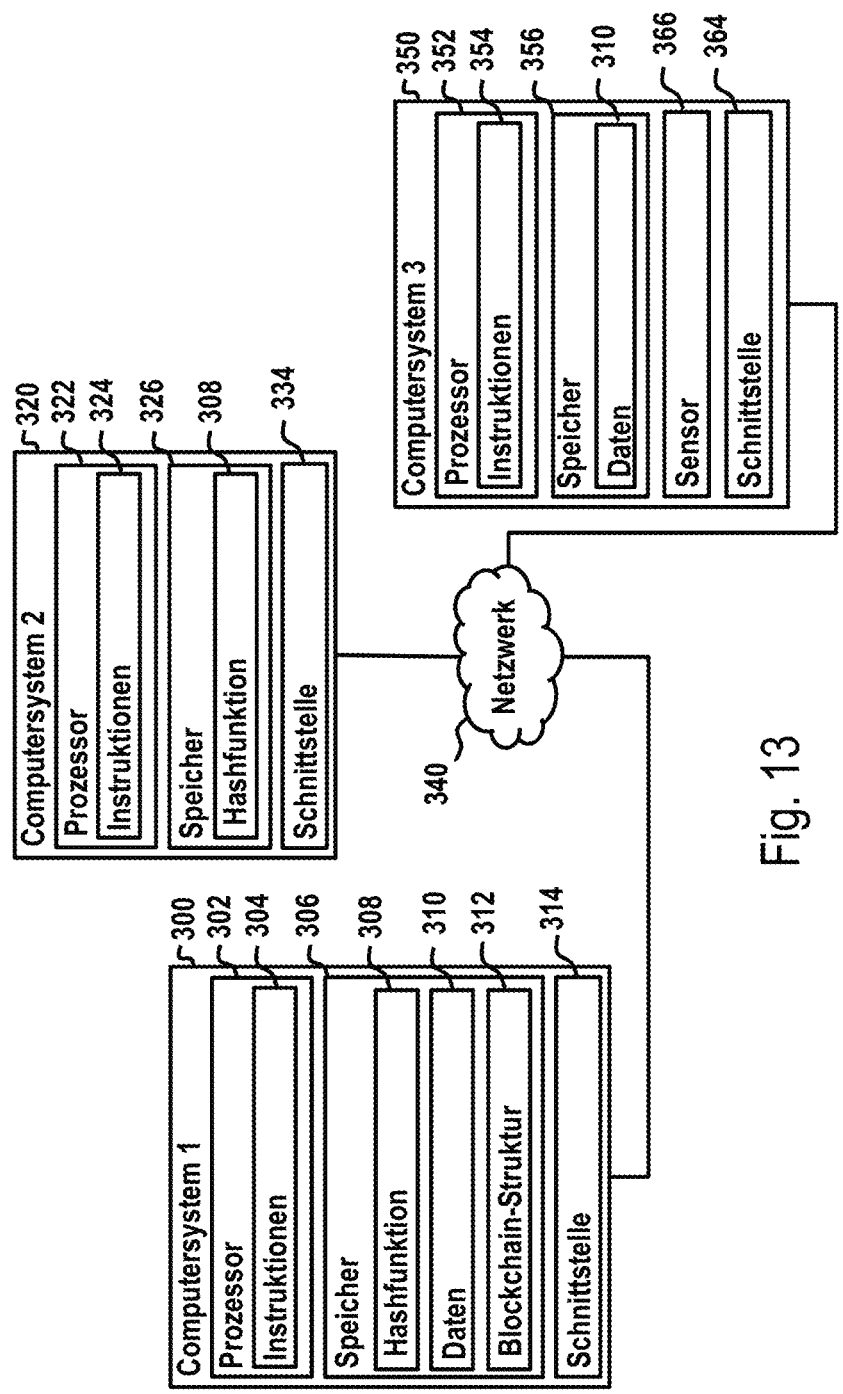
FIG. 13 shows a schematic block diagram of one embodiment of an exemplary telecommunications system.

FIG. 13 shows the exemplary data storage system 300 from FIG. 12, which is configured as a telecommunications system able to communicate with other computer systems, such as the computer systems 320, 350, by way of the communication interface 314 via the network 340. For example, the data 310 is provided by the computer system 350 via the network 340.

The computer system 350 comprises a storage device 356, for example, for storing the data 310 to be protected against manipulations by the computer system 300. According to embodiments, the data 310 is data characteristic of a digitally encoded document. For example, the data 310 is a hash value of the content of a digitally encoded document. According to further embodiments, the data 310 is transaction data of a transaction prompted, logged and/or carried out by the computer system 350. According to further embodiments, the data 310 is sensor data detected by way of a sensor 366 of the computer system 350. The computer system 350 furthermore comprises a processor 352 which is configured to execute program instructions 354. According to embodiments, the computer system 350 is likewise configured as a telecommunications system, which is able to communicate with the computer systems 300 by way of the communication interface 364 via the network 340. The computer system 350 is prompted to transmit the data 310 to the computer system 300, for example, when the program instructions 354 are executed by the processor 352. The transmission of the data 310 via the network 340 may, for example, take place in response to a request from the computer system 300 or at the own initiative of the computer system 350.

FIG. 13 furthermore shows the computer system 320, which is likewise configured as a telecommunications system and able to communicate with the computer systems 300 by way of the communication interface 364 via the network 340. For example, the computer system 320 comprises a processor 322 including program instructions 324. The processor 322 is configured to execute the program instructions 324, an execution of the program instructions 324 by the processor 322 prompting the computer system 320 to request the blockchain structure 312 expanded by the data 310 via the network from the computer system 300. In response to a corresponding request, the computer system 320 receives the blockchain structure 312, for example.

According to embodiments, the computer system 320 is able to read out the data stored in the blockchain structure 312 from the blockchain structure 312. The computer system 320 is able to check the integrity of the read-out data, for example, using the hash function 308 stored in the storage device 326, by way of which the check values encompassed in the blockchain structure 312 may be recalculated for the bidirectional link of the blocks. The read-out data is data to verify the authenticity of a digitally encoded document, for example. The corresponding document is provided to the computer system 320 by the computer system 350 via the network 340, for example. If the read-out data is a hash value of the content of the provided document, for example, it is possible to check the authenticity of the document based on this data. For example, a hash value is calculated for the document by the computer system 320. If the calculated hash value agrees with the read-out data, the provided document is acknowledged as authentic.

The blockchain structure 312 received by the computer system 320 may, in particular, also be used for checks in the offline mode, that is, when the network 340 is temporarily not available. Data to be checked for the authenticity thereof by way of the blockchain structure 312 is received or read in directly by the computer system 320, for example, without the network 340. This data may then be checked for the authenticity thereof using the blockchain structure 312, for example, when the data stored in the blockchain structure 312 is a copy of the data to be checked or includes a feature, such as a hash value, of the data to be checked.

LIST OF REFERENCE NUMERALS 100 blockchain structure
102 first block
104 second block
106 antepenultimate block
108 penultimate block
110 last block
112 additional block
201 placeholder of the first block
204 check value of the first block
206 combined check value of the first block
208 data of the first block
222 check value of the penultimate block
223 placeholder of the last block
224 check value of the last block
226 combined check value of the last block
228 data last block of the additional block
242 check value of the additional block
243 placeholder of the additional block
246 combined check value of the additional block
248 data of the additional block
300 first computer system
302 first processor
304 first program instructions
306 first storage device
308 hash function
310 data to be protected
312 first blockchain structure
314 first communication interface
320 second computer system
322 second processor
324 second program instructions
326 second storage device
334 second communication interface
340 network
350 third computer system
352 third processor
354 third program instructions
356 third storage device
364 third communication interface
366 sensor

The invention claimed is:

1. A method for storing data in a tamper-proof manner in an electronic storage device, using a bidirectionally linked blockchain structure, which includes at least a first block and a last block, the method comprising:
providing the bidirectionally linked blockchain structure;
providing the data to be stored;
generating an additional block for expanding the blockchain structure, which includes the data to be stored and is intended to be linked bidirectionally to the last block of the blockchain structure, the last block of the blockchain structure including stored data;
calculating a first check value of the last block for bidirectionally linking the additional block to the last block of the blockchain structure, the first check value of the last block being calculated using a first hash value, the calculation of which comprises applying a hash function to the data stored in the last block and the data to be stored in the additional block;
calculating a check value of the additional block for bidirectionally linking the additional block to the last block of the blockchain structure, the check value of the additional block being calculated using a second hash value, the calculation of which comprises applying the hash function to the data stored in the last block and to the data to be stored in the additional block;
adding the first check value of the last block to the last block;
adding the check value of the additional block to the additional block; and
storing the blockchain structure expanded by the additional block.

2. The method according to claim 1, wherein the last block of the blockchain structure includes a second check value of the last block, which bidirectionally links the last block to a penultimate block of the blockchain structure, the second check value of the last block having been calculated using a third hash value, the calculation of which comprises applying the hash function to data stored in the penultimate block and to the data stored in the last block.

3. The method according to claim 2, wherein the method furthermore comprises:
calculating a combined check value of the last block, the combined check value of the last block being calculated using a fourth hash value, the calculation of which comprises applying the hash function to a combination of the first and second check values of the last block; and
adding the combined check value of the last block to the last block of the blockchain structure.

4. The method according to claim 3, wherein the combined check value $KPW_N$ of the last block is calculated as follows:

$$KPW_N = \text{Hash}\{PW_{N-1} + PW_N\},$$

where $PW_{N-1}$ denotes the second check value of the last block, and $PW_N$ denotes the first check value of the last block.

5. The method according to claim 1, wherein the last block includes a placeholder, which identifies the last block as the last block of the blockchain structure, the addition of the first check value of the last block to the last block comprising:
  replacing the placeholder of the last block with the first check value of the last block.

6. The method according to claim 1, wherein the additional block includes a placeholder, which identifies the additional block as the last block of the expanded blockchain structure.

7. The method according to claim 6, wherein the method furthermore comprises:
  calculating a combined check value of the additional block, the combined check value of the additional block being calculated using a fifth hash value, the calculation of which comprises applying the hash function to a combination of the check value of the additional block and the placeholder of the additional block; and
  adding the combined check value of the additional block to the additional block of the blockchain structure.

8. The method according to claim 7, wherein the combined check value $KPW_{N+1}$ of the additional block is calculated as follows:

$$KPW_{N+1} = \text{Hash}\{PW_N + PH_{N+1}\},$$

where $PW_N$ denotes the check value of the additional block, and $PH_{N+1}$ denotes the placeholder of the additional block.

9. The method according to claim 1, wherein the first block of the blockchain structure includes a placeholder, which identifies the first block as the first block of the blockchain structure.

10. The method according to claim 1, wherein the blocks of the blockchain structure each have a square (M×M) matrix structure, M being a natural number greater than or equal to two.

11. The method according to claim 10, wherein the stored data of the blocks of the blockchain structure is in each case encompassed by entries of a square submatrix of the matrix structure of the corresponding block.

12. The method according to claim 1, wherein the calculation of the first check value of the last block and the calculation of the check value of the additional block comprise:
  calculating a combination of the data stored in the last block and of the data stored in the additional block;
  calculating a hash value of the combination of the data stored in the last block and of the data stored in the additional block; and
  dividing the hash value of the combination of the data stored in the last block and of the data stored in the additional block into a first portion and a second portion, the first check value of the last block including the first portion, and the check value of the additional block including the second portion.

13. The method according to claim 12, wherein the combination of the data stored in the last block and of the data stored in the additional block includes a product of a submatrix of the last block, the entries of which encompass the data stored in the last block, and of a submatrix of a penultimate block of the blockchain structure, the entries of which encompass the data to be stored in the additional block.

14. The method according to claim 12, wherein the calculation of the second check value of the last block comprises:
  calculating a combination of the data stored in a penultimate block of the blockchain structure and of the data stored in the last block;
  calculating a hash value of the combination of the data stored in the penultimate block and of the data stored in the last block; and
  dividing the hash value of the combination of the data stored in the penultimate block and of the data stored in the last block into a first portion and a second portion, a check value of the penultimate block including the first portion, and the second check value of the last block including the second portion.

15. The method according to claim 1, wherein the first check value of the last block and the check value of the additional block are identical.

16. The method according to claim 15, wherein the first check value $PW_N$ of the last block is calculated as follows:

$$PW_N = \text{Hash}\{D_{N+1} + \text{Hash}[D_N + PW_{N-1}]\},$$

where $D_{N+1}$ denotes the data to be stored of the additional block, $D_N$ denotes the stored data of the last block, and $PW_{N-1}$ denotes a second check value of the last block.

17. The method according to claim 16, wherein the second check value $PW_{N-1}$ of the last block was calculated as follows:

$$PW_{N-1} = \text{Hash}\{D_N + \text{Hash}[D_{N-1} + PW_{N-2}]\},$$

where $D_N$ denotes the stored data of the last block, $D_{N-1}$ denotes the stored data of a penultimate block, and $PW_{N-2}$ denotes a check value of the penultimate block.

18. The method according to claim 1, wherein consecutive blocks of the bidirectionally linked blockchain structure are each bidirectionally linked to one another, in each case the preceding block of two consecutive blocks including a check value of the preceding block, which was calculated using data of the preceding block and data of the subsequent block, and the subsequent block of the consecutive blocks including a check value of the subsequent block, which was calculated using data of the preceding block and data of the subsequent block.

19. The method according to claim 1, wherein the data to be stored includes data that is characteristic of the content of a digitally encoded document, the provision of the data to be stored including receiving the data by way of a communication interface via a network from a computer system creating the digitally encoded document, the method furthermore comprising:
  receiving a request for a current version of the blockchain structure by way of the communication interface via the network from a requesting computer system; and
  transmitting the expanded blockchain structure by way of the communication interface via the network to the requesting computer system in response to the received request.

20. The method according to claim 1, wherein the data to be stored includes data of a transaction, the provision of the data to be stored including receiving the data by way of a communication interface via a network from a computer system involved in carrying out the transaction, the method furthermore comprising:
  receiving a request for a current version of the blockchain structure by way of the communication interface via the network from a requesting computer system; and
  transmitting the expanded blockchain structure by way of the communication interface via the network to the requesting computer system in response to the received request.

21. The method according to claim 1, wherein the data to be stored includes status data of a device, the provision of the data to be stored including receiving the data by way of a communication interface via a network from a computer system detecting the status data by way of a sensor, the method furthermore comprising:
- receiving a request for a current version of the blockchain structure by way of the communication interface via the network from a requesting computer system; and
- transmitting the expanded blockchain structure by way of the communication interface via the network to the requesting computer system in response to the received request.

22. The method according to claim 1, wherein the data to be stored includes data characterizing a processing operation of a digitally encoded document, the provision of the blockchain structure including receiving the document to be processed, which includes the blockchain structure, and reading out the blockchain structure from the received document, the provision of the data to be stored including processing the received document and generating the data, and the storage of the expanded blockchain structure (including adding the expanded blockchain structure to the processed document and storing the processed document including the expanded blockchain structure.

23. The method according to claim 22, wherein the method furthermore comprises:
- receiving a request for the processed document by way of a communication interface via a network from a requesting computer system; and
- transmitting the processed document including the expanded blockchain structure by way of the communication interface via the network to the requesting computer system in response to the received request.

24. An electronic data storage system for storing data in a tamper-proof manner in a bidirectionally linked blockchain structure, which comprises at least a first block and a last block, wherein the data storage system comprises a processor and an electronic storage device including machine-readable instructions, an execution of the machine-readable instructions by the processor prompting the data storage system to carry out a method, comprising:
- providing the bidirectionally linked blockchain structure;
- providing the data to be stored;
- generating an additional block for expanding the blockchain structure, which includes the data to be stored and is intended to be linked bidirectionally to the last block of the blockchain structure, the last block of the blockchain structure including stored data;
- calculating a first check value of the last block for bidirectionally linking the additional block to the last block of the blockchain structure, the first check value of the last block being calculated using a first hash value, the calculation of which comprises applying a hash function to the data stored in the last block and the data to be stored in the additional block;
- calculating a check value of the additional block for bidirectionally linking the additional block to the last block of the blockchain structure, the check value of the additional block being calculated using a second hash value, the calculation of which comprises applying the hash function to the data stored in the last block and to the data to be stored in the additional block;
- adding the first check value of the last block to the last block;
- adding the check value of the additional block to the additional block; and
- storing the blockchain structure expanded by the additional block.

25. A telecommunications system, comprising an electronic data storage system according to claim 24 and a communication interface for communicating via a network, wherein the provision of the data to be stored includes receiving the data by way of a communication interface via a network, the carried-out method furthermore comprising:
- receiving a request for a current version of the blockchain structure by way of the communication interface via the network from a requesting telecommunications system; and
- transmitting the expanded blockchain structure by way of the communication interface via the network to the requesting telecommunications system in response to the received request.

26. A telecommunications system, comprising an electronic data storage system according to claim 24 and a communication interface for communicating via a network, wherein the data to be stored includes data characterizing a processing operation of a digitally encoded document, the provision of the blockchain structure including receiving the document to be processed, which includes the blockchain structure, and reading out the blockchain structure from the received document, the provision of the data to be stored including processing the received document and generating the data, and the storage of the expanded blockchain structure including adding the expanded blockchain structure to the processed document and storing the processed document including the expanded blockchain structure, the carried-out method furthermore comprising:
- receiving a request for the processed document by way of the communication interface via the network from a requesting telecommunications system; and
- transmitting the processed document including the expanded blockchain structure by way of the communication interface via the network to the requesting telecommunications system in response to the received request.

* * * * *